United States Patent
Murakami et al.

(10) Patent No.: US 9,066,031 B2
(45) Date of Patent: Jun. 23, 2015

(54) SOLID-STATE IMAGING DEVICE AND IMAGING APPARATUS

(71) Applicant: PANASONIC CORPORATION, Osaka (JP)

(72) Inventors: Masashi Murakami, Kyoto (JP); Makoto Ikuma, Kyoto (JP); Yutaka Abe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/182,725

(22) Filed: Feb. 18, 2014

(65) Prior Publication Data

US 2014/0160331 A1 Jun. 12, 2014

Related U.S. Application Data

(63) Continuation of application No. PCT/JP2012/004993, filed on Aug. 6, 2012.

(30) Foreign Application Priority Data

Aug. 30, 2011 (JP) ................................. 2011-187847

(51) Int. Cl.
*H04N 3/14* (2006.01)
*H04N 5/335* (2011.01)
(Continued)

(52) U.S. Cl.
CPC ............... *H04N 5/335* (2013.01); *H04N 5/378* (2013.01); *H04N 5/3595* (2013.01); *H04N 5/3658* (2013.01)

(58) Field of Classification Search
CPC ..... H04N 5/357; H04N 5/3742; H04N 5/378; H04N 5/374; H04N 5/23241; H04N 5/3698; H04N 5/3658; H04N 5/335
USPC .................................................. 348/294–324
See application file for complete search history.

(56) References Cited

U.S. PATENT DOCUMENTS 5,488,415 A * 1/1996 Uno ............................... 348/241
5,982,318 A * 11/1999 Yiannoulos .................... 341/155
(Continued)

FOREIGN PATENT DOCUMENTS

JP 2007-281540 A 10/2007
JP 2009-159271 A 7/2009
(Continued)

OTHER PUBLICATIONS

International Search Report issued in PCT/JP2012/004993, dated Sep. 4, 2012, with English translation, 5 pages.

*Primary Examiner* — Chia-Wei A Chen
(74) *Attorney, Agent, or Firm* — McDermott Will & Emery LLP

(57) ABSTRACT

A solid-state imaging device includes a plurality of pixel cells arranged in rows and columns, a plurality of vertical signal lines each of which is provided for a corresponding one of the columns, and a plurality of column circuits each of which is provided for a corresponding one or more of the columns and into each of which are input the signal voltages output to one or more of the vertical signal lines disposed in the corresponding one or more of the columns. Each of the plurality of column circuits includes an amplifier that includes a constant current source transistor, the solid-state imaging device further includes a reference current source circuit that supplies a first bias voltage to gates of a plurality of the constant current source transistors included in the column circuits, and each of the column circuits further includes a sample-and-hold circuit that holds the first bias voltage.

14 Claims, 21 Drawing Sheets

(51) Int. Cl.
*H04N 5/378* (2011.01)
*H04N 5/359* (2011.01)
*H04N 5/365* (2011.01)

(56) References Cited

U.S. PATENT DOCUMENTS

| | | | |
|---|---|---|---|
| 7,755,686 B2 | 7/2010 | Toyama et al. | |
| 8,035,066 B2 | 10/2011 | Abe et al. | |
| 8,243,178 B2* | 8/2012 | Toyama et al. | 348/300 |
| 2008/0007640 A1* | 1/2008 | Fuchikami et al. | 348/301 |
| 2008/0111905 A1 | 5/2008 | Toyama et al. | |
| 2008/0252742 A1* | 10/2008 | Oike | 348/222.1 |
| 2008/0259193 A1* | 10/2008 | Toya et al. | 348/300 |
| 2009/0166513 A1 | 7/2009 | Abe et al. | |
| 2010/0253772 A1 | 10/2010 | Toyama et al. | |
| 2010/0264298 A1 | 10/2010 | Ryoki et al. | |
| 2010/0271523 A1* | 10/2010 | Hara | 348/302 |
| 2010/0289932 A1* | 11/2010 | Hashimoto | 348/300 |
| 2011/0115959 A1* | 5/2011 | Toyama et al. | 348/308 |
| 2011/0304751 A1* | 12/2011 | Joboji et al. | 348/243 |
| 2011/0317051 A1 | 12/2011 | Abe et al. | |
| 2011/0317056 A1* | 12/2011 | Matsumoto | 348/308 |
| 2012/0002088 A1* | 1/2012 | Fukushima | 348/294 |
| 2012/0008028 A1* | 1/2012 | Egawa | 348/300 |
| 2012/0008029 A1* | 1/2012 | Matsuda et al. | 348/300 |
| 2012/0008030 A1* | 1/2012 | Kono et al. | 348/301 |
| 2012/0038807 A1* | 2/2012 | Ackland et al. | 348/300 |
| 2012/0038808 A1* | 2/2012 | Yamanaka et al. | 348/302 |
| 2012/0057056 A1* | 3/2012 | Oike | 348/294 |
| 2012/0127356 A1* | 5/2012 | Matsuura | 348/313 |
| 2013/0093902 A1* | 4/2013 | Honda et al. | 348/164 |
| 2013/0182157 A1* | 7/2013 | Ono | 348/294 |
| 2013/0201372 A1 | 8/2013 | Ryoki et al. | |

FOREIGN PATENT DOCUMENTS

| | | |
|---|---|---|
| JP | 2010-268440 A | 11/2010 |
| JP | 2011-109282 A | 6/2011 |

* cited by examiner

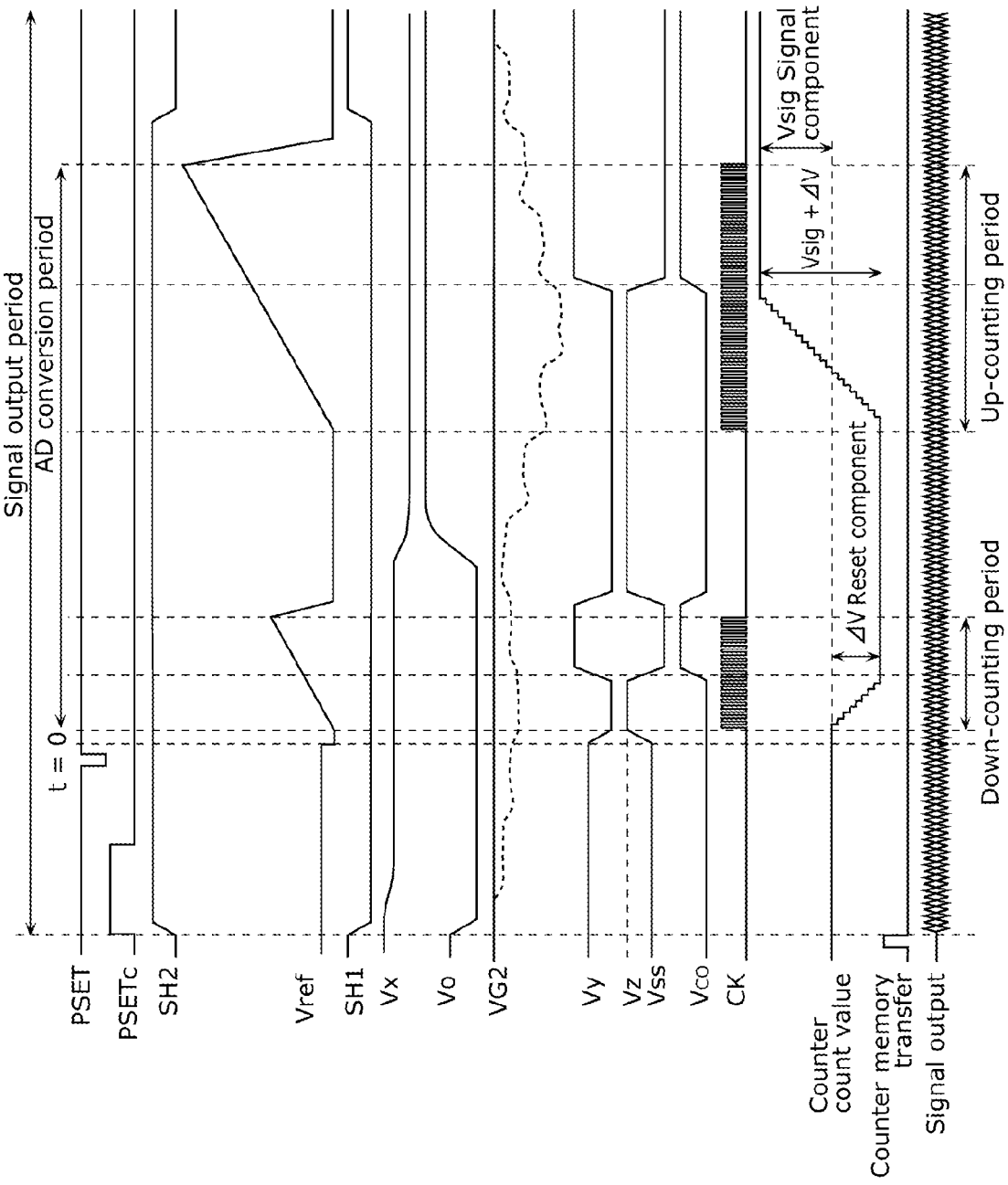

1st column, ith column, jth column, mth column

1st column, ith column, jth column, mth column

SOLID-STATE IMAGING DEVICE AND IMAGING APPARATUS

CROSS REFERENCE TO RELATED APPLICATION

This is a continuation application of PCT Patent Application No. PCT/JP2012/004993 filed on Aug. 6, 2012, designating the United States of America, which is based on and claims priority of Japanese Patent Application No. 2011-187847 filed on Aug. 30, 2011. The entire disclosures of the above-identified applications, including the specifications, drawings and claims are incorporated herein by reference in their entirety.

FIELD

The present disclosure relates to a solid-state imaging device and an imaging apparatus.

BACKGROUND

In recent years, MOS (Metal Oxide Semiconductor) solid-state imaging devices have been extensively developed as solid-state imaging devices suitable for application to digital video cameras, digital still cameras, and the like. Such a MOS solid-state imaging device is configured to amplify and extract a signal charge resulting from photoelectric conversion performed by a photoelectric conversion element for each pixel. The MOS solid-state imaging device has a feature that a drive circuit for a pixel array including pixels that are two-dimensionally arranged in rows and columns and a signal processing circuit can be integrated on the same chip as the pixel array.

As the signal output system of the MOS solid-state imaging device, a column-parallel output signal output system that selects a plurality of pixels of the pixel array on a row-by-row basis and simultaneously reads out the signals of the pixels of the selected row in the column direction (the direction along pixel columns) is mainly used. Various configurations have been proposed for the signal output circuit of this column-parallel output solid-state imaging device. As one example of the most advanced forms of such configurations, a MOS solid-state imaging device is known that is equipped with a column-parallel AD conversion device having a configuration in which an AD converter is disposed for each column and analog signals output from pixels are extracted as digital signals.

FIG. 21 is a block diagram showing a MOS solid-state imaging device 10 equipped with a column-parallel AD conversion device described in Patent Literature (PTL) 1.

As shown in FIG. 21, signals generated by a plurality of pixel cells 11 are simultaneously read out to a plurality of vertical signal lines 22-1, 22-2, ... 22-m that are respectively disposed for the columns. Additionally, the solid-state imaging device 10 includes comparators 31, and the signals that have been read out to the vertical signal lines 22 are simultaneously AD-converted by column-parallel AD converters 23-1, 23-2, ... 23-m disposed respectively corresponding to the vertical signal lines 22-1, 22-2, ... 22-m.

CITATION LIST

Patent Literature

[PTL 1] Japanese Unexamined Patent Application Publication No. 2007-281540

SUMMARY

Technical Problem

However, the solid-state imaging device described in the related art has a problem in that the noise resulting from the amplifiers of the comparators and the like causes deterioration in noise characteristics and image quality.

In view of the foregoing problem, one non-limiting and exemplary embodiment provides a solid-state imaging device capable of inhibiting the deterioration in noise characteristics and image quality.

Solution to Problem

According to an aspect of the present disclosure, there is provided a solid-state imaging device including: a plurality of pixel cells arranged in rows and columns, each of the pixel cells including a photoelectric conversion element that generates a signal charge according to an amount of light received and an amplifying transistor that generates a signal voltage by amplifying the signal charge; a plurality of vertical signal lines each of which is provided for a corresponding one of the columns and to each of which are output the signal voltages generated by pixel cells included in the plurality of pixel cells that are disposed in a corresponding one of the columns; and a plurality of column circuits each of which is provided for a corresponding one or more of the columns and into each of which are input the signal voltages output to one or more of the vertical signal lines disposed in the corresponding one or more of the columns, wherein each of the plurality of column circuits includes an amplifier into which input signals based on the signal voltages are input and that includes a constant current source transistor, the solid-state imaging device further includes a reference current source circuit that supplies a first bias voltage to gates of a plurality of the constant current source transistors included in the plurality of column circuits, and each of the plurality of column circuits further includes a sample-and-hold circuit that holds the first bias voltage.

With this configuration, the sample-and-hold circuits respectively provided for the column circuits each hold the bias voltage supplied to the gate of the constant current source transistor. Accordingly, when the power supply voltage line or the ground line undergoes voltage fluctuations resulting from the fluctuation of the current of any one of the plurality of amplifiers, it is possible to suppress the fluctuation of the current flowing through the other amplifiers. Accordingly, the solid-state imaging device according to an aspect of the present disclosure can inhibit the deterioration in S/N characteristics and image quality.

Each of the plurality of column circuits may include: an AD conversion unit configured to convert the signal voltages into digital signals, the AD conversion unit may include a comparator that compares the signal voltages with a reference signal, the amplifier may be an amplifier that is included in the comparator and into which the signal voltages and the reference signal are input, and the sample-and-hold circuit may hold the first bias voltage during a period in which the comparator compares the reference signal and one of the signal voltages.

With this configuration, when the power supply voltage line or the ground line undergoes voltage fluctuations as a result of the output signal of the amplifier included in a given comparator being inverted, the solid-state imaging device according to an embodiment of the present disclosure can suppress the fluctuation of the current flowing through the amplifiers included in the other comparators.

The amplifier may include: a differential amplifier that compares the signal voltages with the reference signal; and an amplifying amplifier that includes the constant current source transistor and amplifies an output signal of the differential amplifier, and the sample-and-hold circuit may hold the first bias voltage during a period in which the differential amplifier compares the reference signal and the one of the signal voltages.

With this configuration, it is possible to reduce a noise resulting from the current fluctuation of the amplifying amplifier, which undergoes significant current fluctuations.

Each of the plurality of column circuits may include a signal amplifier that include the amplifier and amplifies one of the signal voltages, and the sample-and-hold circuit may hold the first bias voltage during a period in which the signal amplifier amplifies the one of the signal voltages.

With this configuration, when the power supply voltage line or the ground line undergoes voltage fluctuations as a result of the change in the output signal of the amplifier included in a given signal amplifier, the solid-state imaging device according to an aspect of the present disclosure can suppress the fluctuation of the current flowing through the amplifiers included in the other signal amplifiers.

The sample-and-hold circuit may include: a sample-and-hold transistor connected between the gate of the constant current source transistor and the reference current source circuit; and a sample-and-hold capacitor connected to the gate of the constant current source transistor.

With this configuration, it is possible to easily perform the timing control of the sample-and-hold circuit.

Furthermore, with the use of the sampling capacitor, it is possible to suppress the fluctuation of the sample-and-hold voltage resulting from the effect of the leakage current of the sample-and-hold transistor and the effect of the gate leakage of the constant current source transistor during the sample-and-hold period.

The solid-state imaging device may further include: a bias line connected to the reference current source circuit; and a plurality of the sample-and-hold circuits included in the plurality of column circuits, wherein the reference current source circuit may supply the first bias voltage to the gates of the plurality of constant current source transistors via the bias line.

With this configuration, the solid-state imaging device according to an aspect of the present disclosure can simultaneously apply a bias voltage to the plurality of sample-and-hold circuits. This can reduce the period for which the bias voltage is applied to the plurality of sample-and-hold circuits, thus improving the frame rate.

The reference current source circuit may include: a transistor that forms a current mirror circuit together with each of the constant current source transistors; and a reference current source that supplies a reference current to the transistor.

With this configuration, the solid-state imaging device according to an aspect of the present disclosure can supply a constant current to the amplifier in accordance with the current supplied from the reference current source and the mirror ratio of the current mirror circuit.

The reference current source circuit may include a plurality of first reference current source units each of which is provided for a corresponding one of the column circuits, and each of the plurality of first reference current source units may include: a current mirror transistor that forms a current mirror circuit together with the constant current source transistor and supplies the first bias voltage to the gate of the constant current source transistor; and a reference current source transistor that supplies a reference current to the current mirror transistor.

With this configuration, both terminals of the sample-and-hold transistor are electrically isolated between the plurality of columns, and it is therefore possible to reduce a noise commonly generated in the plurality of columns. Accordingly, it is possible to reduce a horizontal stripe-shaped noise.

The reference current source circuit may further include: a bias line connected to gates of a plurality of the reference current source transistors included in the plurality of first reference current source units; and a second reference current source unit configured to supply a second bias voltage to the gates of the plurality of reference current source transistors via the bias line.

With this configuration, it is possible to simultaneously apply a bias voltage to the plurality of sample-and-hold circuits. This can shorten the period for which the bias voltage is supplied to the plurality of sample-and-hold circuits, thus improving the frame rate.

The sample-and-hold circuit may sample the first bias voltage outside the period in which the comparator compares the reference signal and the one of the signal voltages.

With this configuration, it is possible to easily perform the timing control of the sample-and-hold circuit.

The sample-and-hold circuit may sample the first bias voltage outside the period in which the signal amplifier amplifies the one of the signal voltages.

With this configuration, it is possible to easily perform the timing control of the sample-and-hold circuits.

The amplifier may be a grounded-source amplifier.

With this configuration, it is possible to reduce a noise resulting from the current fluctuations of the grounded-source amplifier, which undergoes significant current fluctuations.

The column circuits may each further include a power-down control unit configured to stop the amplifier.

With this configuration, the solid-state imaging device according to an aspect of the present disclosure can achieve reduced power consumption by stopping the amplifier whose operation has been completed. Furthermore, when the power supply voltage line or the ground line undergoes voltage fluctuations as a result of a given amplifier being stopped, it is possible to suppress the fluctuation of the current flowing through the other amplifiers.

Note that the present disclosure can be implemented not only as the above-described solid-state imaging device, but also as a method for controlling or driving a solid-state imaging device that includes the characteristic units included in the solid-state imaging device as steps.

Furthermore, the present disclosure can be implemented as a semiconductor integrated circuit (LSI) implementing some or all of the functions of the above-described solid-state imaging device or as an imaging apparatus (camera) including the above-described solid-state imaging device.

Advantageous Effects

As described above, one or more embodiments of the present disclosure can provide a solid-state imaging device capable of inhibiting the deterioration in noise characteristics and image quality.

BRIEF DESCRIPTION OF DRAWINGS

These and other objects, advantages and features of the invention will become apparent from the following description thereof taken in conjunction with the accompanying drawings that illustrate a specific embodiment of the present invention.

FIG. 15 is a timing chart showing operations of the solid-state imaging device according to the fourth embodiment.

DESCRIPTION OF EMBODIMENTS

Hereinafter, embodiments of the present disclosure will be described in detail with reference the drawings. Note that each of the embodiments described below shows a specific preferred example of the present disclosure. The numerical values, shapes, materials, components, arrangement and connection of the components, steps, the order of steps and so forth shown in the following embodiments are merely examples, and are not intended to limit the scope of the present disclosure. The present disclosure is to be limited only by the claims. Therefore, of the components in the following embodiments, components not recited in any of the independent claims, which represent the broadest concept of the present disclosure, are described as optional components that are not necessarily required but constitute more preferred embodiments.

First Embodiment

A solid-state imaging device according to a first embodiment of the present disclosure includes an amplifier provided for each column and a sample-and-hold circuit that holds (samples and holds) the gate voltage of a constant current source transistor included in the amplifier. Accordingly, when the power supply voltage line undergoes voltage fluctuations resulting from the fluctuation of the current flowing through any one of the plurality of amplifiers, it is possible to suppress the fluctuation of the current flowing through the other amplifiers. Thus, the solid-state imaging device can inhibit the deterioration in S/N characteristics and image quality.

First, a description will be given of the configuration of a solid-state imaging device 10A according to the first embodiment.

Figure 1:
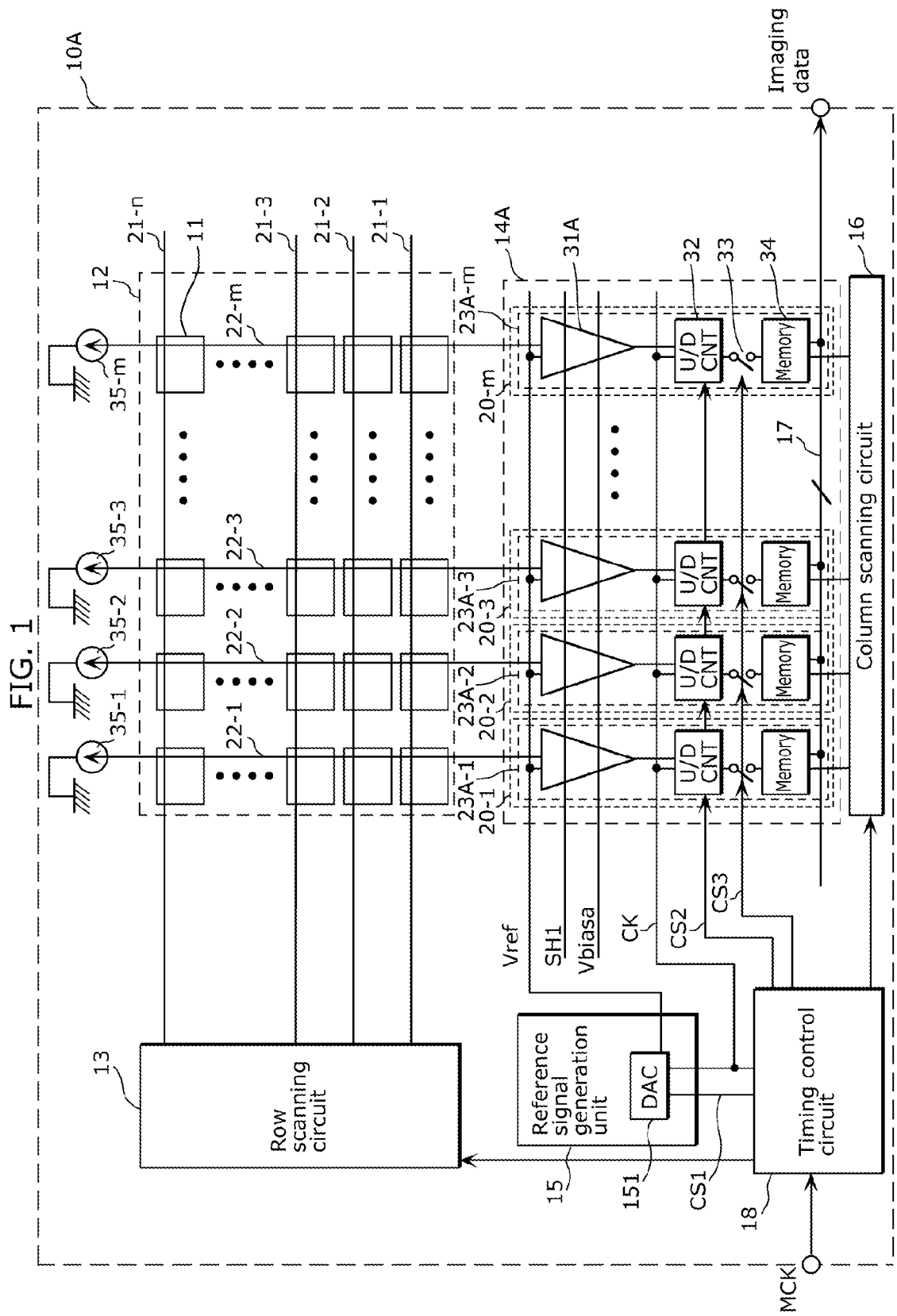
FIG. 1 is a block diagram showing an exemplary configuration of a solid-state imaging device according to a first embodiment of the present disclosure.

FIG. 1 is a block diagram showing the configuration of the solid-state imaging device 10A according to the first embodiment. As shown in FIG. 1, the solid-state imaging device 10A includes a pixel array 12 including pixel cells 11 that are two-dimensionally arranged in rows and columns (in a matrix), each pixel cell being a repeating unit including at least one photoelectric conversion element, a row scanning circuit 13, a column processing unit 14A, a reference signal generation unit 15, a column scanning circuit 16, a horizontal output line 17, and a timing control circuit 18.

In this configuration, the timing control circuit 18 generates a clock signal, a control signal and so forth serving as the basis of operations of the row scanning circuit 13, the column processing unit 14A, the reference signal generation unit 15, the column scanning circuit 16 and so forth based on a master clock MCK. Then, the timing control circuit 18 supplies the generated clock signal and control signal to the row scanning circuit 13, the column processing unit 14A, the reference signal generation unit 15, the column scanning circuit 16 and so forth.

The row scanning circuit 13, the column processing unit 14A, the reference signal generation unit 15, the column scanning circuit 16, the horizontal output line 17, and the timing control circuit 18 are peripheral driving and signal processing systems that drive and control the pixel cells 11 of the pixel array 12. These driving and signal processing systems are integrated on the same chip (semiconductor substrate) as the pixel array 12.

In the pixel array 12, m columns and n rows of pixel cells 11 are two-dimensionally arranged. For this pixel arrangement of m columns n rows, row control lines 21 (21-1 to 21-$n$) are respectively disposed for the rows, and vertical signal lines 22 (22-1 to 22-$m$) are respectively disposed for the columns. One end of each of the row control lines 21-1 to 21-$n$ is connected to the output terminal of a corresponding one of the rows of the row scanning circuit 13. The row scanning circuit 13 is composed of a shift register, an address decoder and so forth, and performs the control of the row address and the row scanning of the pixel array 12 via the row control lines 21-1 to 21-$n$.

The column processing unit 14A includes, for example, AD converters (analog-to-digital converters) 23A-1 to 23A-$m$ that are respectively provided for the pixel columns of the pixel array 12, or in other words, in one-to-one correspondence with the vertical signal lines 22-1 to 22-$m$. The AD converters 23A each convert an analog signal (also referred to as "pixel signal" or "signal voltage") output from each of the pixel cells 11 disposed in the corresponding column into a digital signal, and output the converted digital signal.

The solid-state imaging device 10A also includes a plurality of column circuits 20 (20-1 to 20-m) each of which is provided for a corresponding one of the columns. Each of the column circuits 20-1 to 20-m includes an AD converter 23 disposed in the corresponding column.

The reference signal generation unit 15 includes, for example, a DAC (digital-to-analog converter) 151 as means for generating a reference signal Vref having a so-called ramp waveform in which the voltage value changes stepwise over time. Note that the means for generating the reference signal Vref having a ramp waveform is not limited to the DAC 151.

Under control of a control signal CS1 provided from the timing control circuit 18, the DAC 151 generates the reference signal Vref having a ramp waveform based on a clock CK provided from the timing control circuit 18. Additionally, the DAC 151 supplies the generated reference signal Vref to the AD converters 23A-1 to 23A-m included in the column processing unit 14A.

All of the AD converters 23A-1 to 23A-m have the same configuration. Here, a description is given, taking the AD converter 23A-m as an example. The AD converter 23A-m includes a comparator 31A, an up/down counter (denoted as "U/DCNT" in FIG. 1) 32 serving as counting means, a transfer switch 33, and a memory 34.

The comparator 31A compares a signal voltage Vx of the vertical signal line 22-m that corresponds to a pixel signal output from each pixel cell 11 in the mth column of the pixel array 12 with the reference signal Vref having a ramp waveform supplied from the reference signal generation unit 15. Then, the comparator 31A sets, for example, an output signal Vco to H (High) level when the reference signal Vref is greater than the signal voltage Vx, and sets the output signal Vco to L (Low) level when the reference signal Vref is less than or equal to the signal voltage Vx.

The up/down counter 32 is an asynchronous counter, and operates under control of a control signal CS2 provided from the timing control circuit 18. Additionally, a clock CK is provided to the up/down counter 32 from the timing control circuit 18 at the same time when the clock signal CK is provided to the DAC 151. The up/down counter 32 measures a comparison period from the start to the end of the comparison operation in the comparator 31A by performing down-counting or up-counting in synchronization with the clock CK.

Under control of a control signal CS3 provided from the timing control circuit 18, the transfer switch 33 is turned on (closed) upon completion of the counting operation by the up/down counter 32 for the pixel cells 11 in a given row. Thereby, the counting result of the aforementioned up/down counter 32 is transferred to the memory 34.

In this way, the analog signals supplied from the pixel cells 11 of the pixel array 12 via the vertical signal lines 22-1 to 22-m on a column-by-column basis are converted into N-bit digital signals by the operations of the comparator 31A and the up/down counter 32 included in each of the AD converter 23A (23A-1 to 23A-m). Then, the converted N-bit digital signals are stored in the memories 34.

The column scanning circuit 16 is composed of a shift register, an address decoder and so forth, and performs the control of the column address and the column scanning of the AD converters 23A-1 to 23A-m in the column processing unit 14A. Under control of the column scanning circuit 16, the N-bit digital signals that have undergone AD conversion by the respective AD converters 23A-1 to 23A-m are sequentially read out to the N-bit-wide horizontal output line 17. Then, the read-out digital signals are output via the horizontal output line 17 to the outside as imaging data.

Although not directly relevant to the present disclosure and hence not particularly shown, a circuit and the like that perform various types of signal processing on the imaging data output via the horizontal output line 17 may also be provided in addition to the above-described components.

In the solid-state imaging device 10A having the above-described configuration according to the present embodiment, the counting result of the up/down counter 32 can be selectively transferred to the memory 34 via the transfer switch 33. Accordingly, it is possible to independently control the counting operation of the up/down counter 32 and the operation of reading out the counting result of the up/down counter 32 to the horizontal output line 17.

Figure 2:
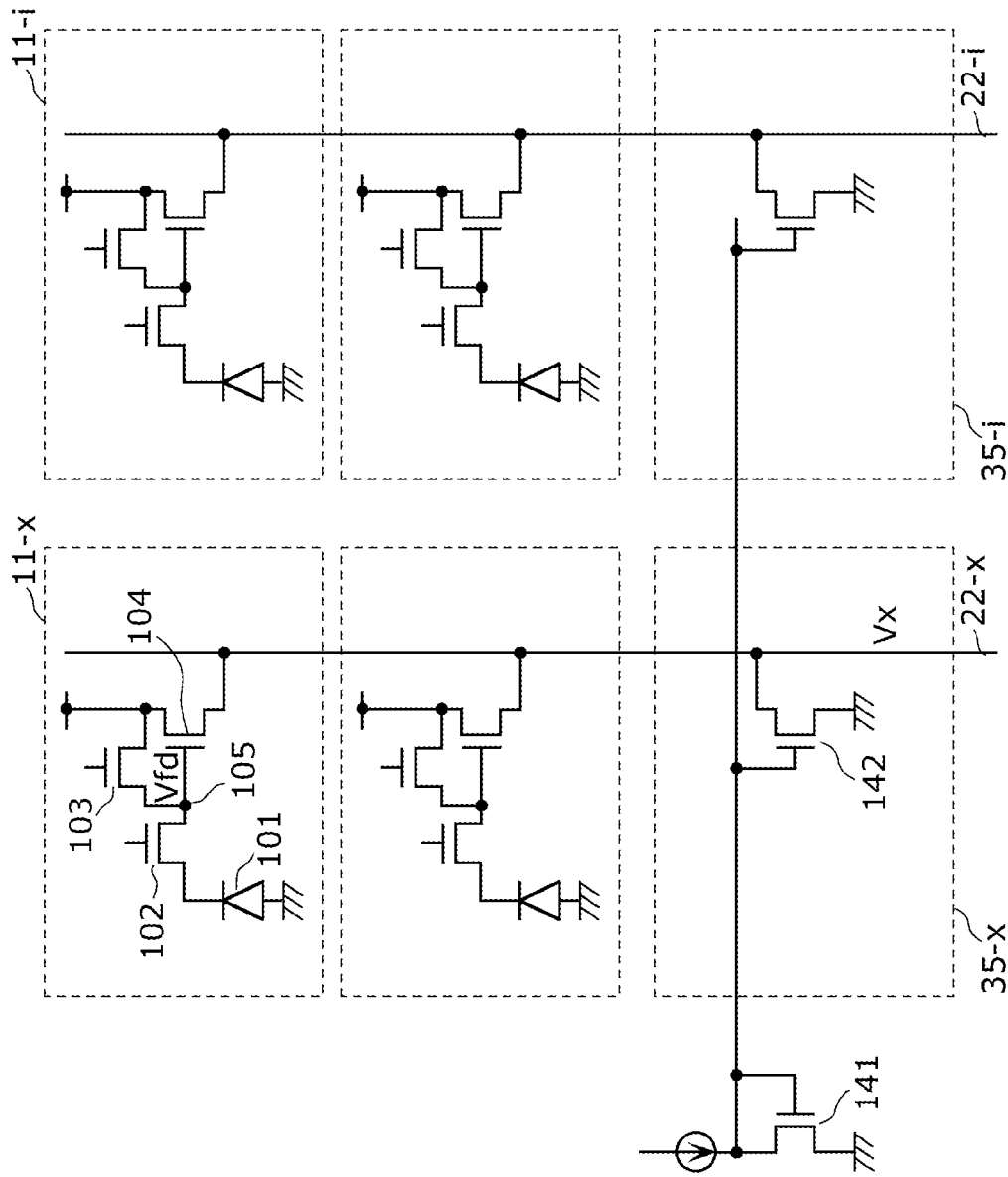
FIG. 2 is a circuit diagram of pixel cells according to the first embodiment.
Figure 3:
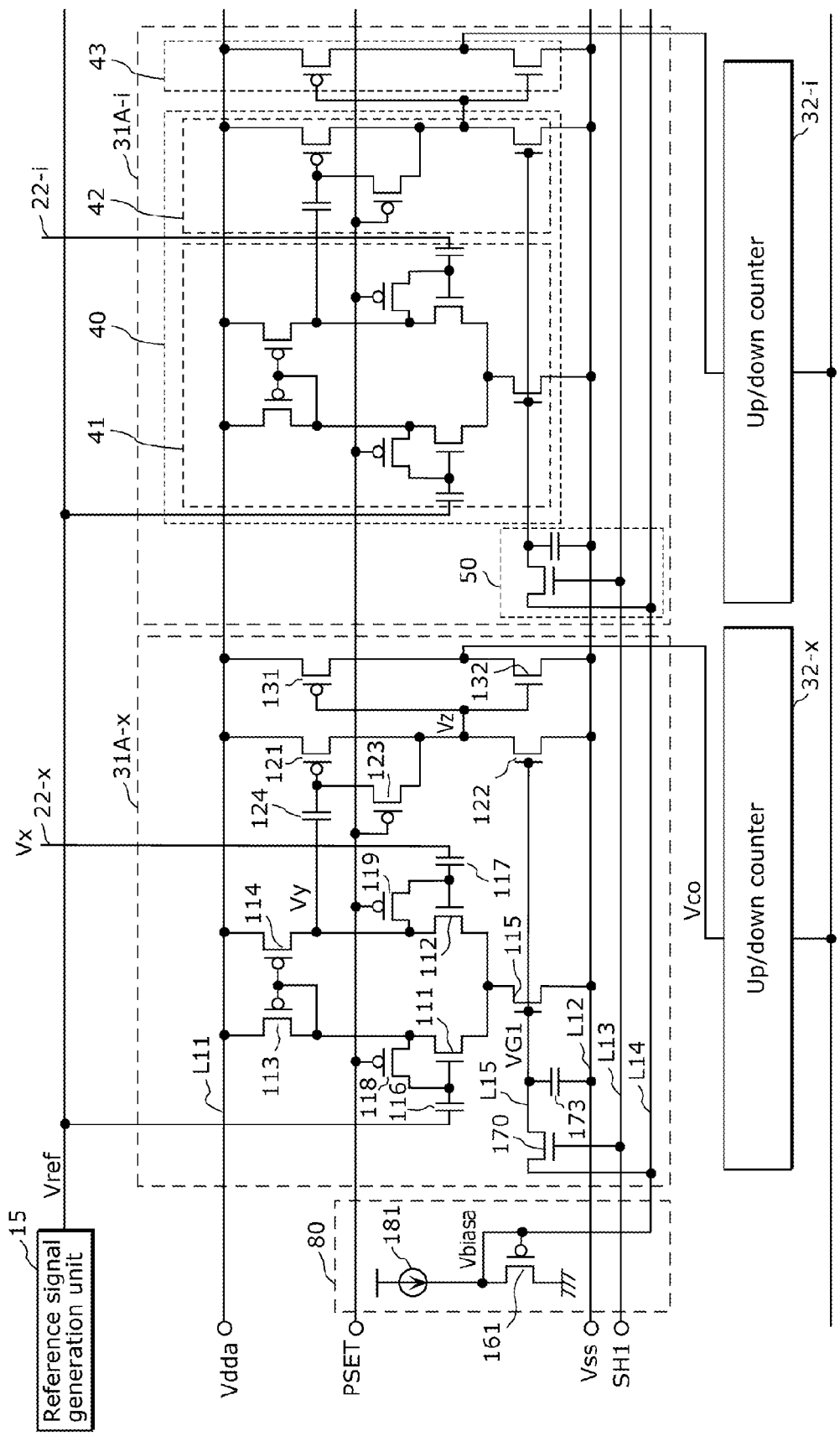
FIG. 3 is a circuit diagram of comparators according to the first embodiment.

FIG. 2 is a circuit diagram showing the circuit configuration of the pixel cells 11 and constant current sources 35. FIG. 3 is a circuit diagram showing an exemplary circuit configuration of comparators 31A according to the first embodiment. FIGS. 2 and 3 show specific circuit configurations of the pixel cells 11 (11-x, 11-i) in the xth column and the ith column, which is adjacent to the xth column, and the comparators 31A (31A-x, 31A-i), respectively.

Each pixel cell 11 has a three-transistor configuration including a photoelectric conversion element 101, an FD (floating diffusion) 105, a transfer transistor 102, a reset transistor 103, and an amplifying transistor 104.

The photoelectric conversion element 101 is, for example, a photodiode, and generates a signal charge according to the amount of light received. The transfer transistor 102 transfers, to the FD 105, a signal charge resulting from photoelectric conversion performed by the photoelectric conversion element 101. The reset transistor 103 controls (resets) a voltage Vfd of the FD 105. The amplifying transistor 104 generates a signal voltage Vx by amplifying the signal charge generated in the photoelectric conversion element 101. Specifically, the amplifying transistor 104 generates a signal voltage Vx corresponding to the voltage Vfd of the FD 105, and outputs the generated signal voltage Vx to the vertical signal line 22 of the corresponding column.

Note that the pixel cell 11 is not limited to a pixel cell having the above-described three-transistor configuration. For example, it is also possible to use, as the pixel cell 11, a pixel cell having a four-transistor configuration including, in addition to the above-described three transistors, a separate selection transistor for selecting pixels.

Each of the vertical signal lines 22 is provided for a corresponding one of the columns and the signal voltages Vx generated by the plurality of pixel cells 11 disposed in the corresponding column are output to the vertical signal line 22. One end of the vertical signal line 22 is connected to a constant current source 35.

The constant current source 35 includes a constant current source transistor 142. In addition, the solid-state imaging device 10A includes a transistor 141 having a diode connected configuration in which the gate and the drain are commonly connected. The constant current source transistor 142 is connected between one end of each vertical signal line 22 and the ground (ground potential), and the gate thereof is connected to the gate of the transistor 141. In other words, the constant current source transistor 142 forms a current mirror circuit together with the transistor 141. Additionally, the transistor 141 is commonly connected to the gates of the plurality of constant current source transistors 142.

Each comparator 31A compares the signal voltage Vx with the reference signal Vref. The comparator 31A includes an amplifier 40 and an inverter 43.

An input signal based on the signal voltage Vx is input into the amplifier 40. The amplifier 40 includes a differential amplifier 41 and an inverting amplifier 42.

The differential amplifier 41 includes differential pair transistors 111 and 112, active load transistors 113 and 114, a constant current source transistor 115, capacitive elements 116 and 117, and switch transistors 118 and 119.

The differential pair transistors 111 and 112 have sources that are commonly connected, and form a differential pair. The reference signal Vref is input via the capacitive element 116 into the gate of one of the differential pair transistors, namely, the differential pair transistor 111. The signal voltage Vx is input via the capacitive element 117 into the gate of the other differential pair transistor 112.

The switch transistor 118 is connected between the gate and the drain of the differential pair transistor 111, and a set signal PSET is selectively provided to the gate. Likewise, the switch transistor 119 is connected between the gate and the drain of the differential pair transistor 112, and a set signal PSET is selectively provided to the gate.

The active load transistor 113 is connected between the drain of the differential pair transistor 111 and a power supply voltage line L11. The active load transistor 114 is connected between the drain of the differential pair transistor 112 and the power supply voltage line L11. The active load transistors 113 and 114 have gates that are commonly connected to each other. The active load transistor 113 has a diode connected configuration in which the gate and the drain are commonly connected, and forms a current mirror circuit together with the active load transistor 114.

A power supply voltage Vdda is applied to the power supply voltage line L11, and a ground potential Vss is applied to a ground line L12.

The constant current source transistor 115 is connected between the common-source connection node of the differential pair transistors 111 and 112 and the ground line L12, and a constant voltage VG1 is provided to the gate of the constant current source transistor 115.

The inverting amplifier 42 is a grounded-source inverting amplifier, and includes an inverting transistor 121, a constant current source transistor 122, a switch transistor 123, and a capacitive element 124. The inverting transistor 121 has a source connected to the power supply voltage line L11 and a gate connected to the drain of the differential pair transistor 112 serving as the output terminal of the differential amplifier 41. The inverting transistor 121 inverts the polarity of the output signal of the differential amplifier 41. The constant current source transistor 122 is connected between the drain of the inverting transistor 121 and the ground line L12, and a constant voltage VG1 is supplied to the gate of the constant current source transistor 122.

The switch transistor 123 is connected between the gate and the drain of the inverting transistor 121, and a set signal PSET is selectively provided to the gate of the switch transistor 123. When the set signal PSET is provided to the gate of the switch transistor 123, the gate and the drain of the inverting transistor 121 are electrically connected to each other. This enables the input and output of the inverting amplifier 42 to be set to predetermined levels.

The capacitive element 124 is provided between the differential amplifier 41 and the inverting amplifier 42, and has the function of DC-isolating the output terminal of the differential amplifier 41 and the input terminal of the inverting amplifier 42 from each other. Specifically, the capacitive element 124 has the function of isolating a reset voltage of the differential amplifier 41 and a reset voltage of the inverting amplifier 42 from each other so as to prevent an electrical short circuit occurring therebetween when the set signal PSET is provided.

The solid-state imaging device 10A according to the present embodiment is characterized by including a reference current source circuit 80 including a transistor 161 that forms a current mirror circuit together with the constant current source transistors 115 and 122 and a reference current source 181 that supplies a reference current to the transistor 161. The reference current source circuit 80 supplies a bias voltage Vbiasa to the gates of the constant current source transistors 115 and 122 of the plurality of comparators 31A respectively disposed for the columns.

Furthermore, the solid-state imaging device 10A is characterized by including a plurality of sample-and-hold circuits 50, each connected to the gates of the constant current source transistors 115 and 122 of the amplifier 40 in the comparator 31A and samples and holds the bias voltage Vbiasa supplied from the reference current source circuit 80 on a column-by-column basis.

The sample-and-hold circuit 50 includes a sample-and-hold transistor 170 and a sample-and-hold capacitor 173. The sample-and-hold transistor 170 is connected between the gates of the constant current source transistors 115 and 122 and a bias line L14 to which the bias voltage Vbiasa is supplied from the reference current source circuit 80. A control signal SH1 is applied to the gate of the sample-and-hold transistor 170. The control signal SH1 controls whether or not to electrically connect the bias line L14 and the gates of the constant current source transistors 115 and 122 to one another.

When the control signal SH1 is at H level, the bias voltage Vbiasa supplied from the reference current source circuit 80 is supplied to the gates of the constant current source transistors 115 and 122. On the other hand, when the control signal SH1 is at L level, the gates of the constant current source transistors 115 and 112 are electrically isolated from the bias line L14. Thereby, the sample-and-hold circuit 50 samples and holds the bias voltage Vbiasa supplied to the constant current source transistor 115 and the constant current source transistor 122.

The sample-and-hold capacitor 173 is connected between the gates of the constant current source transistors 115 and 122 and the ground line L12. The sample-and-hold capacitor 173 holds the bias voltage Vbiasa supplied from the reference current source circuit 80.

Note that the details of the function of the present embodiment will be described later.

The inverter 43 is serially-connected between the power supply voltage line L11 and the ground line L12. The inverter 43 is a CMOS inverter, and includes transistors 131 and 132 of opposite conductivity types whose gates are commonly connected to the drain of the inverting transistor 121 serving as the output terminal of the inverting amplifier 42.

Next, operations of the solid-state imaging device 10A using the comparator 31A having the above-described configuration will be described with reference to the timing chart shown in FIG. 4.

Although the description of specific operations of the pixel cells 11 is omitted here, each pixel cell 11 performs a reset operation using the reset transistor 103 and a transfer operation using the transfer transistor 102 as is well-known. In the reset operation, the voltage of the FD 105 when being reset to a predetermined voltage is output from the pixel cells 11 to the vertical signal lines 22-1 to 22-m as a reset component. In the transfer operation, the voltage of the FD 105 when a signal charge resulting from photoelectric conversion has been transferred from the photoelectric conversion element 101 is output from the pixel cells 11 to the vertical signal lines 22-1 to 22-$m$ as a signal component.

A given row k is selected by row scanning performed by the row scanning circuit 13. After the first readout operation from the pixel cells 11 of the selected row k to the vertical signal lines 22-1 to 22-$m$ is stabilized, the set signal PSET becomes active (L (Low) level). Thereby, the operating points of the differential pair transistors 111 and 112 are determined. Thereafter, the set signal PSET becomes inactive (H (High) level), and the stepped-wave reference signal Vref is provided from the DAC 151 to the respective comparators 31A of the AD converters 23A-1 to 23A-m. Consequently, the differential amplifier 41 performs the operation of comparing the input voltage of the differential pair transistor 112 that is determined from the gate voltage of the amplifying transistor 104 of the pixel cell 11 with the input voltage of the differential pair transistor 111 that is determined from the stepped-wave reference signal Vref.

As the operating sequence, simultaneously with the input of the stepped-wave reference signal Vref into the comparator 31A, a clock CK is provided from the timing control circuit 18 to the up/down counter 32. Thereby, the up/down counter 32 measures the comparison time in each comparator 31A during the first readout operation by a down-counting operation. Then, when the reference signal Vref and the signal voltage Vx of each of the vertical signal lines 22-1 to 22-$m$ have become equal to each other, the output signal Vco of the comparator 31A is inverted from H level to L level. In response to this polarity inversion of the output signal Vco of the comparator 31A, the up/down counter 32 stops the down-counting operation and holds a count value corresponding to the first comparison period in the comparator 31A.

As described above, the reset component $\Delta V$ of the pixel cell 11 is read out in the first readout operation. The reset component $\Delta V$ contains a fixed pattern noise that varies for each pixel cell 11 as an offset. However, the degree of this variation in reset component $\Delta V$ is generally small, and the reset level is common to all pixels. Thus, the signal voltages Vx of the vertical signal line 22-1 to 22-$m$ are substantially known. Accordingly, at the time of the first readout of the reset component $\Delta V$, the comparison period can be shortened by adjusting the reference signal Vref.

In the present embodiment, the comparison of the reset component $\Delta V$ is performed in a 7-bit counting period (128 clocks). In the second readout operation, in addition to the reset component $\Delta V$, the signal component Vsig corresponding to the amount of incident light for each pixel cell 11 is read out in an operation similar the first readout operation of the reset component $\Delta V$. More specifically, after the second readout from the pixel cells 11 of the selected row k to the vertical signal lines 22-1 to 22-$m$ is stabilized, the reference signal Vref is provided from the DAC 151 to the respective comparators 31A of the AD converters 23A-1 to 23A-m. Thereby, the comparators 31A perform the operation of comparing the respective signal voltages Vx of the vertical signal lines 22-1 to 22-$m$ with the reference signal Vref. Simultaneously with this, each up/down counter 32 measures the second comparison time in the comparator 31A by an up-counting operation, which is inverse to the first counting.

Thus, as a result of the up/down counter 32 performing the down-counting operation in the first readout operation and performing the up-counting operation in the second readout operation, the subtraction processing (Second comparison period)−(First comparison period) is automatically performed in the up/down counter 32. Then, when the reference signal Vref and the signal voltages Vx of the vertical signal lines 22-1 to 22-$m$ have become equal to each other, the output signal Vco of the comparator 31A undergoes polarity inversion. In response to this polarity inversion, the counting operation by the up/down counter 32 is stopped. As a result, a count value corresponding to the result of the subtraction processing (Second comparison period)−(First comparison period) is held in the up/down counter 32.

That is, the following equation holds: (Second comparison period)−(First comparison period)=(Signal component Vsig+Reset component $\Delta V$+Offset component of AD converter 23A)−(Reset component $\Delta V$+Offset component of AD converter 23A)=(Signal component Vsig). Thus, through the above-described two readout operations and the subtraction processing in the up/down counter 32, the offset components of the respective AD converters 23A (23A-1 to 23A-m) are removed, in addition to the reset component $\Delta V$ containing a variation for each pixel cell 11. Thus, the solid-state imaging device 10A can extract only the signal component Vsig corresponding to the amount of incident light for each pixel cell 11. Here, the processing for removing the reset component $\Delta V$ containing a variation for each pixel cell 11 is a so-called CDS (Correlated Double Sampling) processing.

During the second readout, the signal component Vsig corresponding to the amount of incident light is read out, and it is therefore necessary to significantly change the reference signal Vref in order to determine the magnitude of the light amount over a wide range. For this reason, the solid-state imaging device 10A according to the present embodiment performs the readout of the signal component Vsig in a 10-bit counting period (1024 clocks). In this case, the number of comparison bits differs between the first and second readouts. However, the AD conversion can be performed with equal accuracy by setting the ramp waveform slope of the reference signal Vref to be the same for the first and second readouts. This can provide a correct subtraction result as the result of the subtraction processing (Second comparison period)−(First comparison period) performed by the up/down counter 32.

After completion of a series of the above-described AD conversion operations, an N-bit digital value is held in the up/down counter 32. Then, the N-bit digital values (digital signals) that have been AD-converted by the AD converters 23A-1 to 23A-m of the column processing unit 14A are sequentially output to the outside through the N-bit wide horizontal output line 17 by column scanning performed by the column scanning circuit 16. Thereafter, the same operation is sequentially repeated for each row, thereby generating a two-dimensional image.

Furthermore, in the solid-state imaging device 10A according to the present embodiment, each of the AD converters 23A-1 to 23A-m includes a memory 34. Accordingly, it is possible to transfer the AD-converted digital values for the pixel cells 11 in the ith row to the memory 34, while performing the operation of outputting the transferred digital values from the horizontal output line 17 to the outside, in parallel with the readout operation and the up/down-counting operation for the pixel cells 11 in the i+1th row.

The present embodiment is characterized in that the bias voltage Vbiasa supplied to the plurality of comparators 31A respectively disposed for the columns is sampled and held at least within the AD conversion period in accordance with the control signal SH1. In other words, the sample-and-hold circuit 50 holds (samples and holds) the bias voltage Vbiasa during a period in which the differential amplifier 41 included in each comparator 31A compares the reference signal Vref and the signal voltage Vx. Additionally, the sample-and-hold circuit 50 samples the bias voltage Vbiasa outside the period in which the comparator 31A compares the reference signal Vref and the signal voltage Vx.

Figure 4:
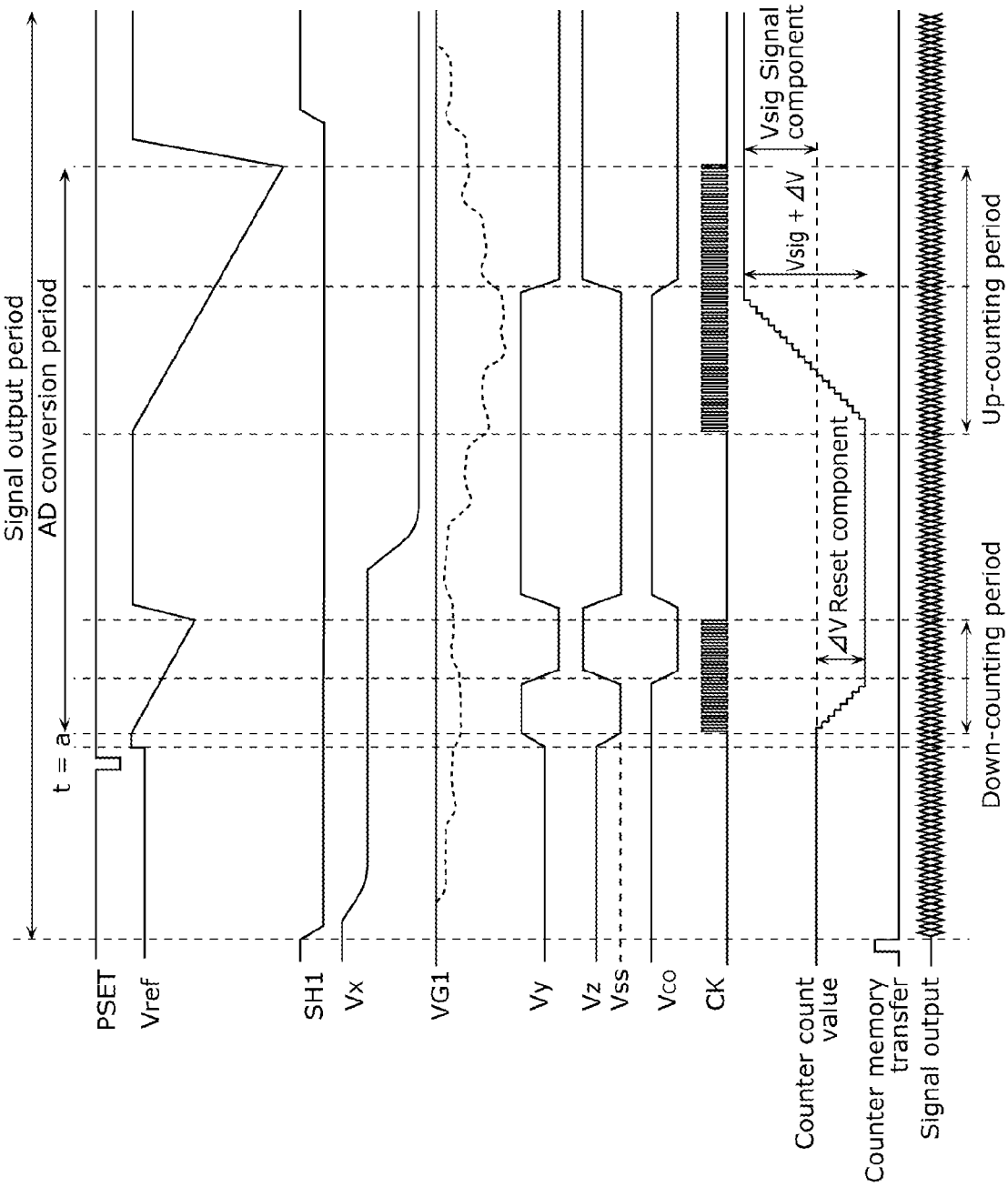
FIG. 4 is a timing chart showing operations of the solid-state imaging device according to the first embodiment.

Specifically, as shown in FIG. 4, the control signal SH1 is controlled to H level before the start of the pixel signal readout, in which the signal voltage Vx changes. Thereby, the sample-and-hold transistor 170 is turned on. Accordingly, the bias voltage Vbiasa is supplied from the reference current source circuit 80 to the gates of the constant current source transistors 115 and 122 in the comparator 31A and the sample-and-hold capacitor 173 connected to these gates.

Here, the transistor 161 that supplies the bias voltage Vbiasa constitutes a current mirror circuit together with the constant current source transistors 115 and 122. Accordingly, a constant current is supplied to the differential amplifier 41 and the inverting amplifier 42 so as to mirror the current supplied from the reference current source 181 constituting the reference current source circuit 80. For example, by setting the W/L size ratio of the transistor 161 and the constant current source transistor 115 to m:1, the differential amplifier 41 can pass a constant current in an amount of 1/m the current supplied from the reference current source 181. Likewise, for the inverting amplifier 42, for example, by setting the W/L size ratio of the transistor 161 and the constant current source transistor 122 to n:1, the inverting amplifier 42 can pass a constant current in an amount 1/n the current supplied from the reference current source 181.

Thus, in the solid-state imaging device 10A according to the present embodiment, the transistor 161 constitutes a current mirror circuit together with the constant current source transistors 115 and 122. Accordingly, even if the characteristics of the constant current source transistor 115 of the differential amplifier 41 and the constant current source transistor 122 of the inverting amplifier 42 fluctuate owing to manufacturing variations and changes in temperature, it is possible to accurately set each of the currents flowing through the differential amplifier 41 and the inverting amplifier 42. That is, the solid-state imaging device 10A can reduce fluctuations in characteristics of the differential amplifier 41 and the inverting amplifier 42 due to manufacturing variations and changes in temperature.

Furthermore, by simultaneously controlling the control signals SH1 supplied to the plurality of columns to H level, it is possible to simultaneously supply the bias voltage Vbiasa to the gates of the constant current source transistors 115 and 122 disposed in the plurality of columns. This allows the bias voltage Vbiasa to be supplied to the plurality of constant current source transistors 115 and 122 in a short period.

Particularly, in the case of a solid-state imaging device suitable for application to digital video cameras, digital still cameras or the like, several thousands of sample-and-hold circuits 50 are provided in the column direction. Accordingly, when a bias voltage is sequentially held for each column, there is a problem in that the frame rate (the number of frames) at which an image signal is output excessively drops. According to the present embodiment, the bias voltage Vbiasa can be simultaneously supplied to the plurality of columns as described above, and it is therefore possible to significantly reduce the drop in the frame rate (the number of frames).

Then, the sample-and-hold transistor 170 is turned off by controlling the control signal SH1 from H level to L level. When the sample-and-hold transistor 170 is turned off, the bias voltage Vbiasa supplied from the reference current source circuit 80 is electrically isolated for each column. Thereby, the bias voltage Vbiasa is sampled and held by the sample-and-hold capacitor 173. For example, each of the voltages VG1 of the xth column and the ith column as shown in FIG. 3 is maintained at the voltage level of the bias voltage Vbiasa. This enables a constant current to be continuously supplied to the differential amplifier 41 and the inverting amplifier 42.

Then, upon completion of the AD conversion as shown in FIG. 4, the control signal SH1 is controlled from L level to H level. Thereby, the sample-and-hold transistor 170 is turned on again. Accordingly, the bias voltage Vbiasa can be supplied from the reference current source circuit 80 to the gates of the constant current source transistors 115 and 122 and the sample-and-hold capacitor 173.

Next, a consideration will be given of a circuit noise resulting from fluctuations in voltage of the power supply voltage line and the ground line.

Figure 5:
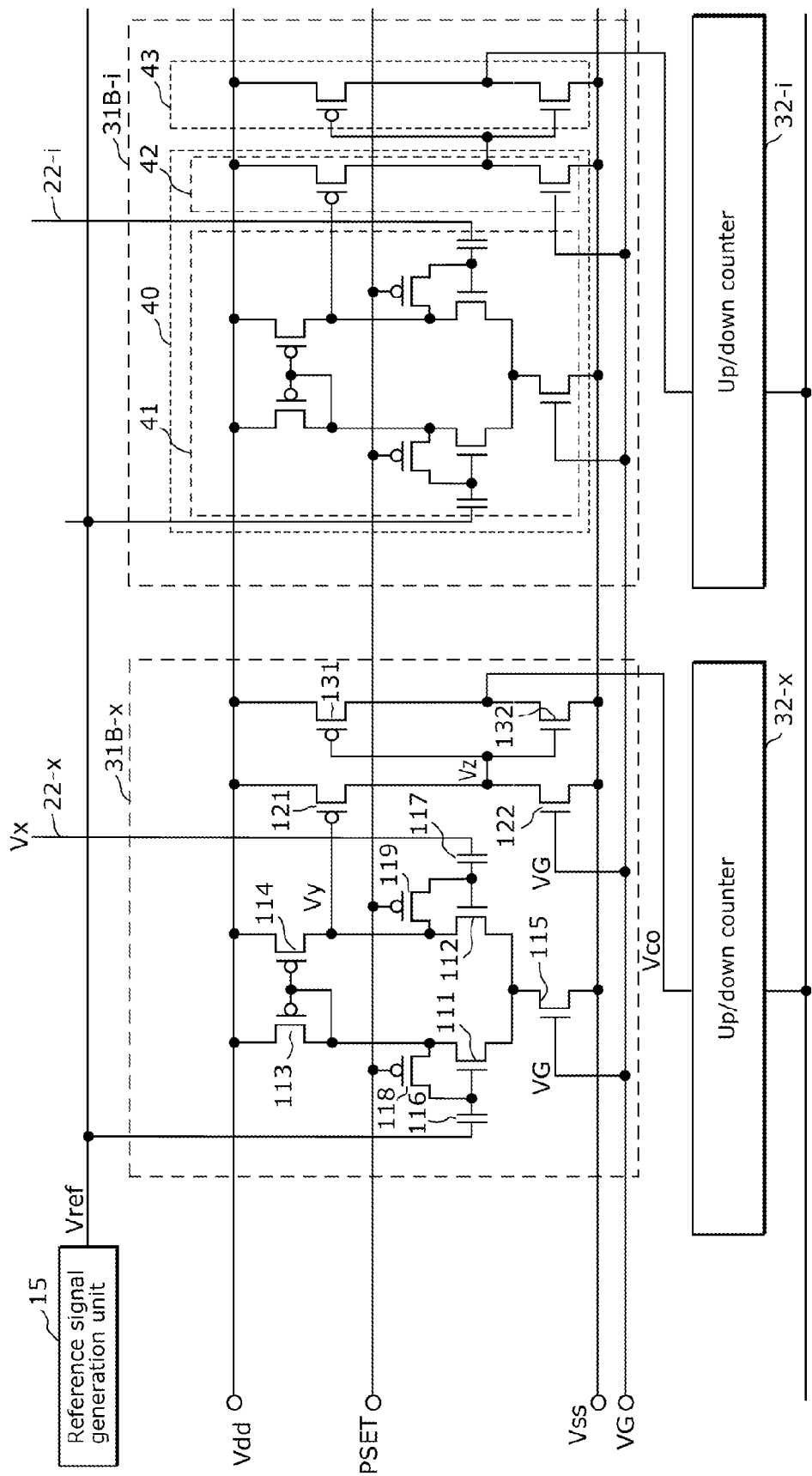
FIG. 5 is a circuit diagram of comparators according to a comparative example of the first embodiment.

To facilitate the understanding of the present disclosure, a consideration will be first given of the configuration of a differential amplifier-type comparator 31B including a differential amplifier 41, an inverting amplifier 42, and an inverter 43 as shown in FIG. 5 as the comparator constituting the AD converter 23A disposed for each column.

The comparator 31B shown in FIG. 5 is different from the comparator 31A shown in FIG. 3 in that the sample-and-hold transistor 170 and the sample-and-hold capacitor 173, which characterize the present embodiment, are not provided. That is, a voltage VG is applied to the gates of the constant current source transistors 115 and 122 from a bias line common to all columns.

Here, when the magnitude relationship between the signal voltage Vx and the reference signal Vref is inverted in the differential amplifier 41, a current flows from the power supply voltage line L11 to the ground line L12 in the inverting amplifier 42. This causes either a drop in voltage of the power supply voltage line L11 or an increase in voltage of the ground line L12 in the corresponding column.

Here, let us assume a case where, in a situation in which the output signal of the comparator 31B in a given column has not yet been inverted, the output signal of the comparator 31B in the adjacent column is inverted. The current flowing through the uninverted comparator 31B fluctuates in response to an increase in voltage of the ground line L12. The current fluctuations will be described, taking the differential amplifier 41 as an example. When ΔV represents the increase in voltage of the ground line L12, I represents the current flowing through the differential amplifier 41 before fluctuation, and ΔI represents the current fluctuations, and gm1 represents the gm of the constant current source transistor 115, the relation of Expression 1 below holds:

$$\Delta I = gm1 \times \Delta V, \; gm1 = \sqrt{(2\beta I)}, \; \beta = W/L \times \mu Cox \qquad \text{(Expression 1)}$$

In the above-described expression, W represents the gate width of the constant current source transistor 115, L represents the gate length, Cox represents the gate oxide film capacitance, and μ represents the mobility.

For the inverting amplifier 42 as well, the current fluctuation represented by Expression 1 occurs in the same manner.

As the currents flowing through the differential amplifier 41 and the inverting amplifier 42 fluctuate, the output signal Vy of the differential amplifier 41 and the output signal Vz of the inverting amplifier 42 fluctuate according to the amount of the fluctuations of the currents. Consequently, the inverting time for the uninverted comparator 31B changes according to the amount of the voltage fluctuations. Additionally, the fluctuations of the currents flowing through the differential amplifier 41 and the inverting amplifier 42 cause fluctuations in the gains and the bands of the differential amplifier 41 and the inverting amplifier 42. Accordingly, the inverting time for the uninverted comparator 31B changes according to the amount of the fluctuations in the gains and the bands. The AD converter 23A is an AD conversion means that converts an analog signal in the time direction on the basis of the output signal Vco of the comparator 31B, and measures the time to obtain a digital signal. Thus, when the inverting time for the uninverted comparator 31B fluctuates, the effect of the fluctuations appears in an image as a circuit noise. Particularly, in a MOS solid-state imaging device including a column-parallel AD conversion device, there is one comparator per column, for example. Consequently, the voltage fluctuation of the ground line L12 becomes significant when the output signals of the comparators are inverted all at once, and this noise poses a problem.

Figure 6:
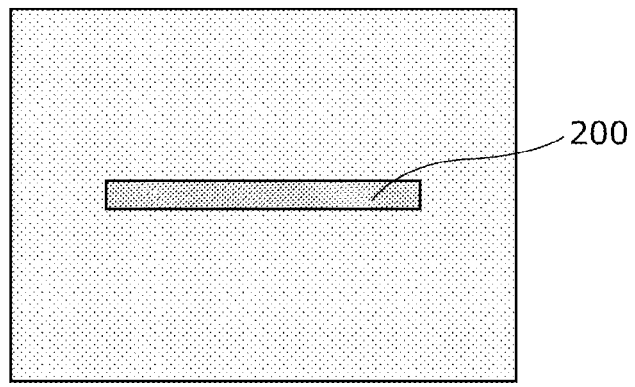
FIG. 6 shows an example of an image according to the first embodiment.

A description will be given of an example of the aforementioned noise, taking, as an example, an image in which a subject 200 that is elongated in the transverse direction and is darker than the surrounding exists as shown in FIG. 6.

Figure 7A:
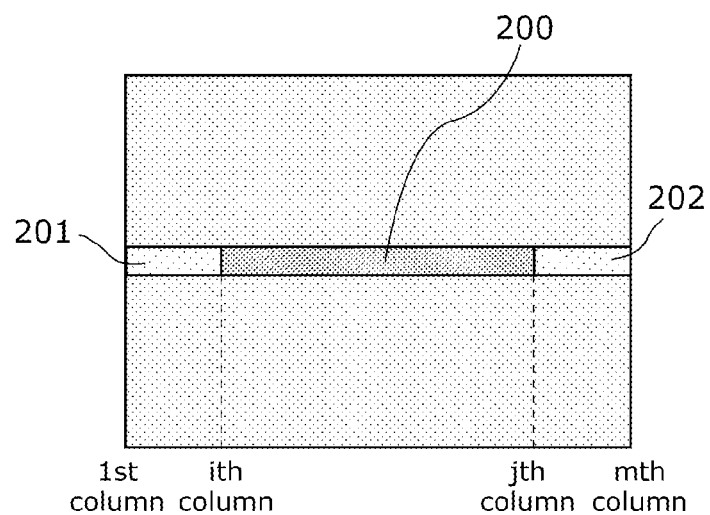
FIG. 7A shows an example of noise generation according to the first embodiment.

When the light corresponding to the subject 200, which is darker than the surrounding, is applied to an imaging plane, the currents flowing through the comparators 31B of a plurality of columns disposed for the ith column to the jth column fluctuate as shown in FIG. 7A. Thereby, the voltages of the power supply voltage line and the ground line commonly connected to the first column to the mth column including the ith column to the jth column fluctuate. As a result, the ground potentials of the amplifiers 40 in a plurality of uninverted comparators 31B disposed for the first column to the i–1th column and the j+1th column to the mth column, which are disposed on the right and left, respectively, of the darker subject 200, fluctuate. The fluctuation of the ground potentials causes fluctuations in the output signals of the uninverted amplifiers 40 as described above, thereby causing fluctuations in the inverting time for the uninverted comparators 31B.

Figure 7B:
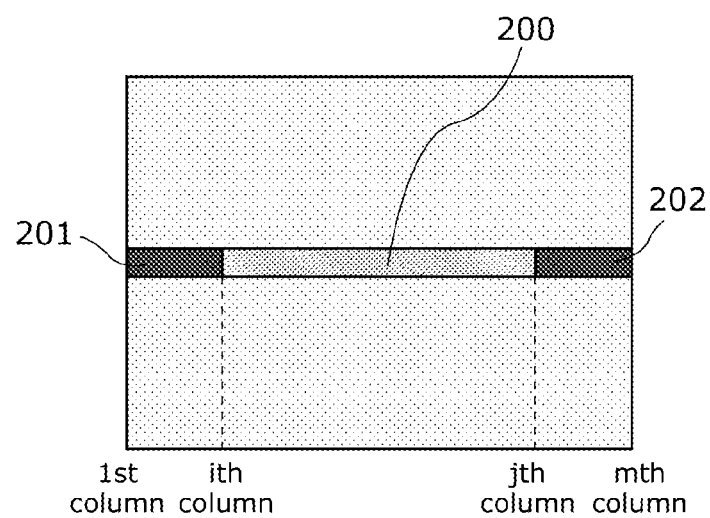
FIG. 7B shows an example of noise generation according to the first embodiment.

When the inverting time for the uninverted comparators 31B fluctuates in the longer direction, a white band-shaped noise is generated in a region 201 extending from the first column to the i–1th column and a region 202 extending from the j+1th column to the mth column, which are located on the right and the left, respectively, of the darker subject 200 as shown in FIG. 7A. On the other hand, when the inverting time for the uninverted comparator 31B fluctuates in the shorter direction, a black band-shaped noise is generated in the regions 201 and 202 as shown in FIG. 7B. Note that whether the band-shaped noise is black or white depends on fluctuations in the current flowing through the plurality of comparators 31B of the first column to the i–1th column and the j+1th column to the mth column that are disposed in the regions 201 and 202, fluctuations in voltage of the power supply voltage line or the ground line that are commonly connected, and the polarity of signals input into the differential amplifier 41.

Next, a consideration will be given of a circuit noise resulting from fluctuations in voltage of the power supply voltage line and the ground line in the solid-state imaging device 10A described thus far with reference to FIGS. 1 to 4.

In the comparator 31A according to the present embodiment, a current flows from the power supply voltage line L11 to the inverting transistor 121 included in the inverting amplifier 42 during the operation for comparing the reference signal Vref and the signal voltage Vx. When a current flows through the inverting transistor 121, the drain voltage of the constant current source transistor 122 increases. This results in an increase in the current flowing from the drain of the constant current source transistor 122 to the ground line L12. Accordingly, the voltage of the power supply voltage line L11 or the ground line L12 of the corresponding column fluctuates.

If the drain voltage of the constant current source transistor 122 of the inverting amplifier 42 significantly fluctuates when the magnitude relationship between the signal voltage Vx and the reference signal Vref is inverted, the voltage of the ground line L12 significantly fluctuates. Specifically, if the operating region of the constant current source transistor 122 changes from an unsaturated region to a saturated region when the magnitude relationship between the signal voltage Vx and the reference signal Vref is inverted, the current flowing through the constant current source transistor 122 significantly fluctuates. This current fluctuation causes the voltage of the ground line L12 to significantly fluctuate.

For example, as shown in FIG. 4, an offset is provided for the reference signal Vref at the timing of t=a so as to prevent erroneous inversion before the start of down-counting. By providing an offset for the voltage of the reference signal Vref in the higher direction with respect to the signal voltage Vx in this way, it is possible to prevent inversion of the magnitude relationship between the reference signal Vref and the signal voltage Vx before the start of down-counting. That is, it is possible to prevent erroneous inversion before the start of down-counting.

Furthermore, by setting the offset voltage for the reference signal Vref to be smaller than the voltage width of Vref, which is caused to fluctuate during the down-counting period, it is possible to reliably invert the magnitude relationship between the reference signal Vref and the signal voltage Vx during the down-counting period.

In addition, by providing the offset voltage for the reference signal Vref at the timing of t=a, the offset voltage is amplified by each of the differential amplifier 41 and the inverting amplifier 42. Accordingly, the output signal Vz of the inverting amplifier 42 drops to the vicinity of Vss. When the output signal Vz of the inverting amplifier 42 is lowered to the vicinity of Vss, the constant current source transistor 122 operates in an unsaturated region, so that the amount of the current flowing from the constant current source transistor 122 to the ground line L12 decreases. At the time of the operation of comparing the reference signal Vref and the signal voltage Vx after the start of down-counting, the voltage of the output signal Vy of the differential amplifier 41 drops, and thereby a current flows to the inverting transistor 121 from the power supply voltage line L11. As a result of the increase of the voltage of the output signal Vz of the inverting amplifier 42, the constant current source transistor 122 operates in a saturated region. Accordingly, the current flowing through the ground line L12 is increased.

A description has been given above of the case where the current flowing through the constant current source transistor 122 significantly fluctuates. However, in the case where no offset is provided for the reference signal Vref before the start of down-counting, the current flowing through the constant current source transistor 122 also fluctuates when the magnitude relationship between the signal voltage Vx and the reference signal Vref is inverted. For example, in the case where the drain voltage of the constant current source transistor 122 has not been lowered to the vicinity of Vss before the inversion of the magnitude relationship between the signal voltage Vx and the reference signal Vref, a current also flows to the inverting transistor 121 from the power supply voltage line L11 upon inversion of the magnitude relationship between the signal voltage Vx and the reference signal Vref. Thereby, the output signal Vz of the inverting amplifier 42 increases. As the output signal Vz of the inverting amplifier 42 increases, the drain-source voltage Vds of the constant current source transistor 122 increases. Accordingly, the current flowing from the constant current source transistor 122 to the ground line L12 is increased by the channel-length modulation effect (1+λVds) shown in Expression 2.

$$Id=\beta/2\times(Vgs-Vt)^2\times(1+\lambda Vds) \quad \text{(Expression 2)}$$

As described above, in a MOS solid-state imaging device including a column-parallel AD conversion device, there is one comparator per column, for example. Consequently, the voltage fluctuation of the ground line L12 resulting from the current fluctuation of the constant current source transistor 122 becomes significant when the comparators are inverted all at once. Then, a noise resulting from the voltage fluctuation poses a problem.

Specifically, let us assume a case where, in a situation in which the output signal of the comparator 31A in a given column has not yet been inverted, the output signal of the comparator 31A in the adjacent column is inverted. In this case, in the uninverted comparator 31A, when the current flowing through the differential amplifier 41 and the inverting amplifier 42 of this comparator has changed as a result of the effect of the fluctuations in voltage of the ground line L12, this effect appears in an image as a circuit noise. For example, transverse band-shaped circuit noises as shown in FIGS. 7A and 7B are generated.

The solid-state imaging device 10A according to the present embodiment reduces the circuit noise resulting from the fluctuations in voltage of the power supply voltage line and the ground line by including the reference current source circuit 80 that supplies the bias voltage Vbiasa to the plurality of comparators 31A respectively disposed for the columns, and a sample-and-hold circuit 50 provided for each comparator 31A. Specifically, the solid-state imaging device 10A samples and holds the bias voltage Vbiasa supplied from the reference current source circuit 80 on a column-by-column basis, thereby reducing the circuit noise. This function will now be specifically described.

Let us assume, as an example of noise reduction a case where, in a situation in which the output signal of the comparator 31A-x in the xth column has not yet been inverted, the output signal of the comparator 31A-i in the adjacent ith column is inverted. When the fluctuation amount of the voltage of the ground line L12 when the output signal of the comparator 31A-i of the ith column has been inverted is taken as ΔV, the voltage of the ground line L12 of the comparator 31A-x of the xth column also fluctuates by ΔV.

Here, in the comparator 31A according to the present embodiment, before the output signal of the comparator 31A-i in the ith column is inverted, the bias voltage Vbiasa is held in the sample-and-hold circuit 50 in the xth column. Thereby, the bias voltage Vbiasa is applied to the gates of the constant current source transistors 115 and 122 in the xth column, and the ground potential Vss is applied to the sources thereof. Thus, the constant current source transistors 115 and 122 generate a current depending on the gate-source voltage difference Vgs=(Vbaisa−Vss) as shown in Expression 1.

In the present embodiment, the control signal SH1 is controlled to L level during the AD conversion period. Thus, the sample-and-hold transistor 170 of the xth column is off, and the voltage Vbiasa-Vss is held in the sample-and-hold capacitor 173 of the xth column. That is, even if the voltage of the ground line L12 connected to the sample-and-hold capacitor 173 fluctuates by ΔV, the voltage difference between both ends of the sample-and-hold capacitor 173 of the xth column is held. Thus, the voltage VG1 of a bias line L15 connected to the sample-and-hold capacitor 173 of the xth column is represented by Vbiasa+ΔV. That is, when the source voltages of the constant current source transistors 115 and 122 in the xth column fluctuate from Vss to Vss+ΔV, the gate voltages VG1 of the constant current source transistors 115 and 122 in the xth column is represented by Vbiasa+ΔV as described above. Here, the constant current source transistors 115 and 122 supply a current depending on the gate-source voltage difference Vgs as shown in Expression 1. Further, since the gate voltage Vg is Vbiasa+ΔV and the source voltage Vs is represented by Vss+ΔV, the gate-to-source voltage Vgs can be expressed by Expression 3 below.

$$Vgs=Vg-Vs=(Vbiasa+\Delta V)-(Vss+\Delta V)=Vbias-Vss \quad \text{(Expression 3)}$$

That is, even if the voltage of the ground line L12 fluctuates by ΔV, the gate-to-source voltages Vgs of the constant current source transistors 115 and 122 in the xth column remain the same. Thus, the solid-state imaging device 10A according to the present embodiment can continuously supply a constant current to the differential amplifier 41 and the inverting amplifier 42 even if the voltage of the ground line L12 fluctuates by ΔV. That is, the solid-state imaging device 10A according to the present embodiment can continuously supply a constant current to the differential amplifier 41 and the inverting amplifier 42 by the function of the sample-and-hold transistor 170 and the sample-and-hold capacitor 173 included in the sample-and-hold circuit 50, without being affected by the voltage fluctuation ΔV of the ground line L12.

Thus, the current of the comparator 31-x will not fluctuate even if the voltage of the ground line L12 fluctuates as a result of the output signal of the comparator 31-i being inverted, and therefore the solid-state imaging device 10A according to the present embodiment can continuously supply a constant current to the uninverted differential amplifier 41 and the inverting amplifier 42. Accordingly, it is possible to reduce transverse band-shaped noises as shown in FIGS. 7A and 7B.

Furthermore, in the present embodiment, the control signal SH1 is controlled to L level during the AD conversion period. Thereby, it is possible to cancel the noise generated by the transistor 161 constituting the reference current source circuit 80 and the reference current source 181 that supplies the reference current. This function will be described with reference to the timing chart shown in FIG. 4.

The voltage VG1 shown in FIG. 4 indicates a bias voltage supplied to the gates of the constant current source transistors 115 and 122. The solid line indicates the voltage VG1 in the present embodiment, the dotted line indicates the voltage VG1 in the case of not using the sample-and-hold circuit 50.

As shown in FIG. 4, in the case of not using the sample-and-hold circuit 50, the bias voltage VG1 fluctuates during the AD conversion period owing to the effect of the noise from the reference current source circuit 80. Among the causes of fluctuations in the voltage VG1, examples of the high-frequency noise include a thermal noise and a 1/f noise of the transistor making up the reference current source circuit 80. In addition, examples of low-frequency noises of the aforementioned causes for fluctuations include the fluctuations of the bias voltage Vbiasa caused by the fluctuations of the ground potential of the reference current source circuit 80 during the AD conversion period. Examples of the causes of fluctuations in the ground potential include current fluctuations caused by the AD conversion operation performed by the comparator 31A during the AD conversion period and current fluctuations caused by a pixel signal readout circuit composed of the amplifying transistor 104 and the constant current source transistor 142.

Figure 8:
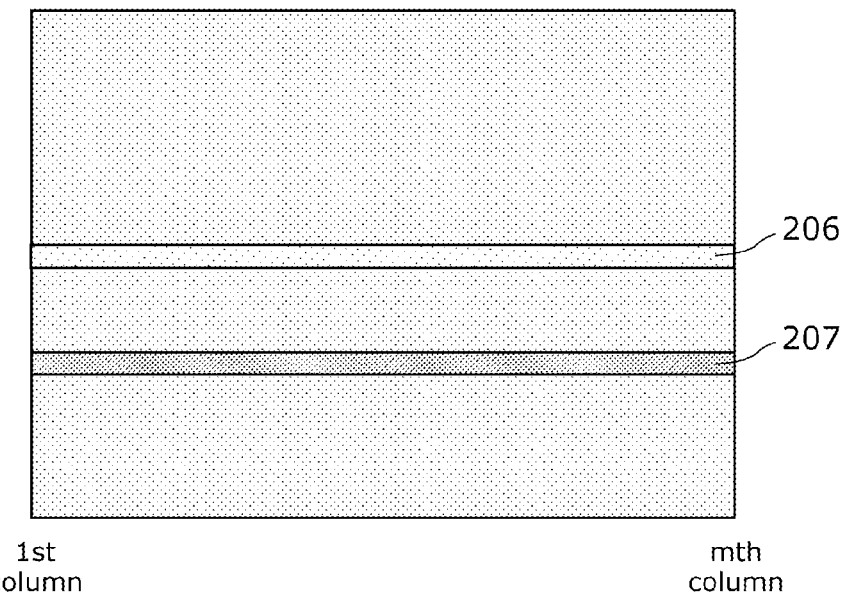
FIG. 8 shows an example of noise generation according to the first embodiment.

When the voltage VG1 supplied to the gates of the constant current source transistor 115 and the constant current source transistor 122 fluctuates during the AD conversion period, the current supplied to the differential amplifier 41 and the inverting amplifier 42 fluctuates, resulting in a noise. Specifically, when the bias voltage supplied to the gates of the constant current source transistors 115 and 122 is neither sampled nor held, the bias voltage Vbiasa is commonly applied to the gates of the constant current source transistors of the plurality of columns. Accordingly, a noise is commonly generated in the comparators 31A of the plurality of columns, resulting in a horizontal stripe-shaped noise. FIG. 8 shows exemplary horizontal stripe-shaped noises 206 and 207. As shown in FIG. 8, the horizontal stripe-shaped noises 206 and 207 are generated in a horizontal stripe shape in an image, and thus are more easily recognized than a noise that is randomly generated in a space. Accordingly, the horizontal stripe-shaped noises 206 and 207 cause a significant deterioration in image quality even if the noise level is small.

In contrast, according to the present embodiment, the bias voltage Vbiasa is sampled and held by the sample-and-hold circuit 50 provided in each column. Additionally, the gate voltage VG1 on each column is electrically isolated from the bias voltage Vbiasa supplied from the reference current source circuit 80. This can inhibit the effect of the noise of the bias voltage supplied from the reference current source circuit 80 on the constant current source transistors 115 and 122 of each column during the AD conversion period. Moreover, the gates of the constant current source transistors 115 and 122 of each column are electrically isolated for each column. Thus, even if a noise is generated in the bias voltage held in the sample-and-hold circuit 50 of a given column, it is possible to inhibit the noise from affecting the bias voltages of the other columns. This can reduce the generation of a horizontal stripe-shaped noise, which is easily recognized.

Furthermore, according to the present embodiment, it is possible to reduce the effect of the noise in the bias voltage supplied from the reference current source circuit 80 before sampling and holding. This function will be described with reference to FIG. 4.

The control signal SH1 becomes H level before the start of the pixel signal readout, and thereby the bias voltage Vbiasa supplied from the reference current source circuit 80 is supplied to the gate electrodes of the constant current source transistors 115 and 122. It is assumed that a noise ΔVN1 has generated at this time in the bias voltage Vbiasa supplied from the reference current source circuit 80.

Then, the control signal SH1 is switched from H level to L level. As a result, the bias voltage Vbiasa+ΔVN1 is held in the sample-and-hold circuit 50.

It is assumed that the noise ΔVN1 causes the reset component ΔV to fluctuate to ΔV+ΔVN2.

In the present embodiment, the up/down counter 32 performs the down-counting operation as the first counting operation and the up-counting operation as the second counting operation in the AD conversion operation as described above. As a result, the subtraction processing (Second comparison period)−(First comparison period) is automatically performed in the up/down counter 32.

Specifically, (Second comparison period)−(First comparison period)=(Signal component Vsig+Reset component ΔV+ΔVN2+Offset component of AD converter 23A)−(Reset component ΔV+ΔVN2+Offset component of AD converter 23A)=(Signal component Vsig). That is, these two readout operations and the subtraction processing in the up/down counter 32 remove the noise £VN2 as well.

Thus, according to the present embodiment, the bias voltage supplied from the reference current source circuit 80 is sampled and held during the AD conversion period. Accordingly, even if a noise has been generated in the bias voltage supplied from the reference current source circuit 80, the effect of this noise can be reduced by CDS processing.

As has been described thus far, the solid-state imaging device 10A according to the present embodiment has an advantage in that the drive circuit and the signal processing circuit of a pixel array including pixels that are two-dimensionally arranged in rows and columns can be integrated on the same chip as the pixel array. Furthermore, the solid-state imaging device 10A can select the pixels of the pixel array on a row-by-row basis, and simultaneously read out the signals of the pixels of the selected row in the column direction (the direction along pixel columns), thus achieving high-speed signal output (readout). This allows the solid-state imaging device 10A to achieve an improved video capturing function and also to support high-speed autofocus.

Moreover, the solid-state imaging device 10A can suppress fluctuations in the current flowing through the comparator 31A-x when the voltage of the ground line or the power supply voltage line fluctuates as a result of the output signal of the comparator 31A-i being inverted. Accordingly, the solid-state imaging device 10A can reduce transverse band-shaped noises as shown in FIGS. 7A and 7B. Thus, the solid-state imaging device 10A can achieve all of device miniaturization, high-speed signal readout, and high image quality at high levels.

Second Embodiment

In a second embodiment of the present disclosure, a description will be given of a modification of the solid-state imaging device 10A according to the first embodiment described above. Note that the following description is focused on the difference to the first embodiment, and the redundant description has been omitted.

The first embodiment has described a configuration as shown in FIG. 3 in which the gate of the constant current source transistor 115 of the differential amplifier 41 and the gate of the constant current source transistor 122 of the inverting amplifier 42 are commonly connected, and the sample-and-hold circuit 50 is provided commonly to the constant current source transistors 115 and 122. In the second embodiment, a sample-and-hold circuit is separately provided for the constant current source transistors 115 and 122.

Figure 9:
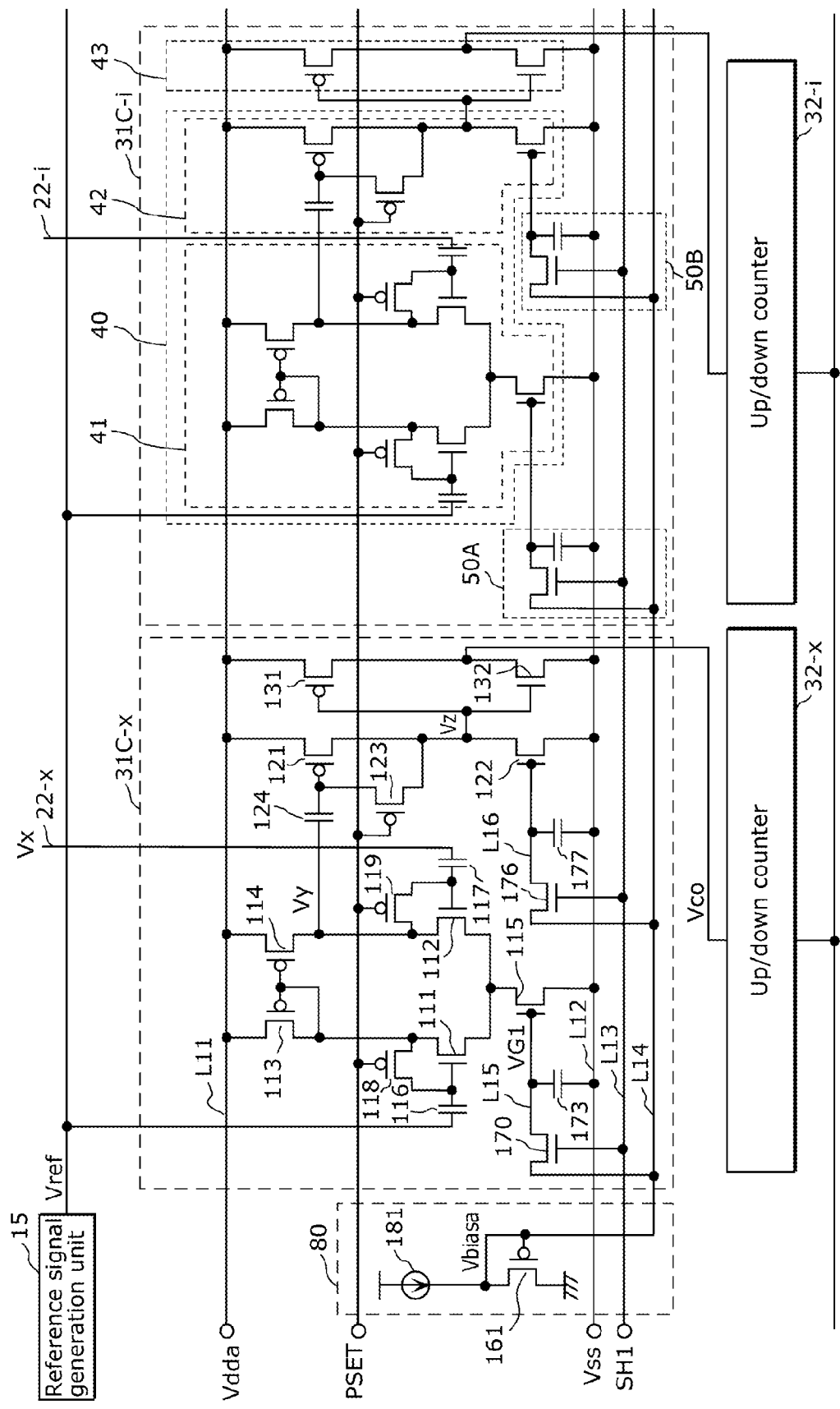
FIG. 9 is a circuit diagram of comparators according to a second embodiment of the present disclosure.

FIG. 9 is a circuit diagram showing the configuration of comparators 31C (31C-x, 31C-i) according to the second embodiment. The comparators 31C shown in FIG. 9 each include a sample-and-hold circuit 50A that holds a bias voltage applied to the gate of the constant current source transistor 115 and a sample-and-hold circuit 50B that holds a bias voltage applied to the gate of the constant current source transistor 122.

The sample-and-hold circuit 50A includes a sample-and-hold transistor 170 and a sample-and-hold capacitor 173. The sample-and-hold transistor 170 is connected between the gate (bias line L15) of the constant current source transistor 115 and the bias line L14. The control signal SH1 is applied to the gate of the sample-and-hold transistor 170. The sample-and-hold capacitor 173 is connected between the gate of the constant current source transistor 115 and the ground line L12. The sample-and-hold capacitor 173 holds a bias voltage Vbiasa supplied from the reference current source circuit 80.

The sample-and-hold circuit 50B includes a sample-and-hold transistor 176 and a sample-and-hold capacitor 177. The sample-and-hold transistor 176 is connected between the gate (bias line L16) of the constant current source transistor 122 and the bias line L14. The control signal SH1 is applied to the gate of the sample-and-hold transistor 176. The sample-and-hold capacitor 177 is connected between the gate of the constant current source transistor 122 and the ground line L12. The sample-and-hold capacitor 177 holds the bias voltage Vbiasa supplied from the reference current source circuit 80.

With the above-described configuration, the solid-state imaging device according to the present embodiment can reduce an effect (kick-back effect) that occurs when fluctuations in the gate voltage of the constant current source transistor 122 of the inverting amplifier 42 resulting from fluctuations in the output level of the inverting amplifier 42 are transmitted back to the gate voltage of the constant current source transistor 115 of the differential amplifier 41 serving as the input stage.

Although the sample-and-hold circuit is provided for both the constant current source transistors 115 and 122 in the example shown in FIG. 9, it is sufficient that at least one bias sample-and-hold circuit is provided for the constant current source transistor of at least one amplifier provided in each column.

Figure 10:
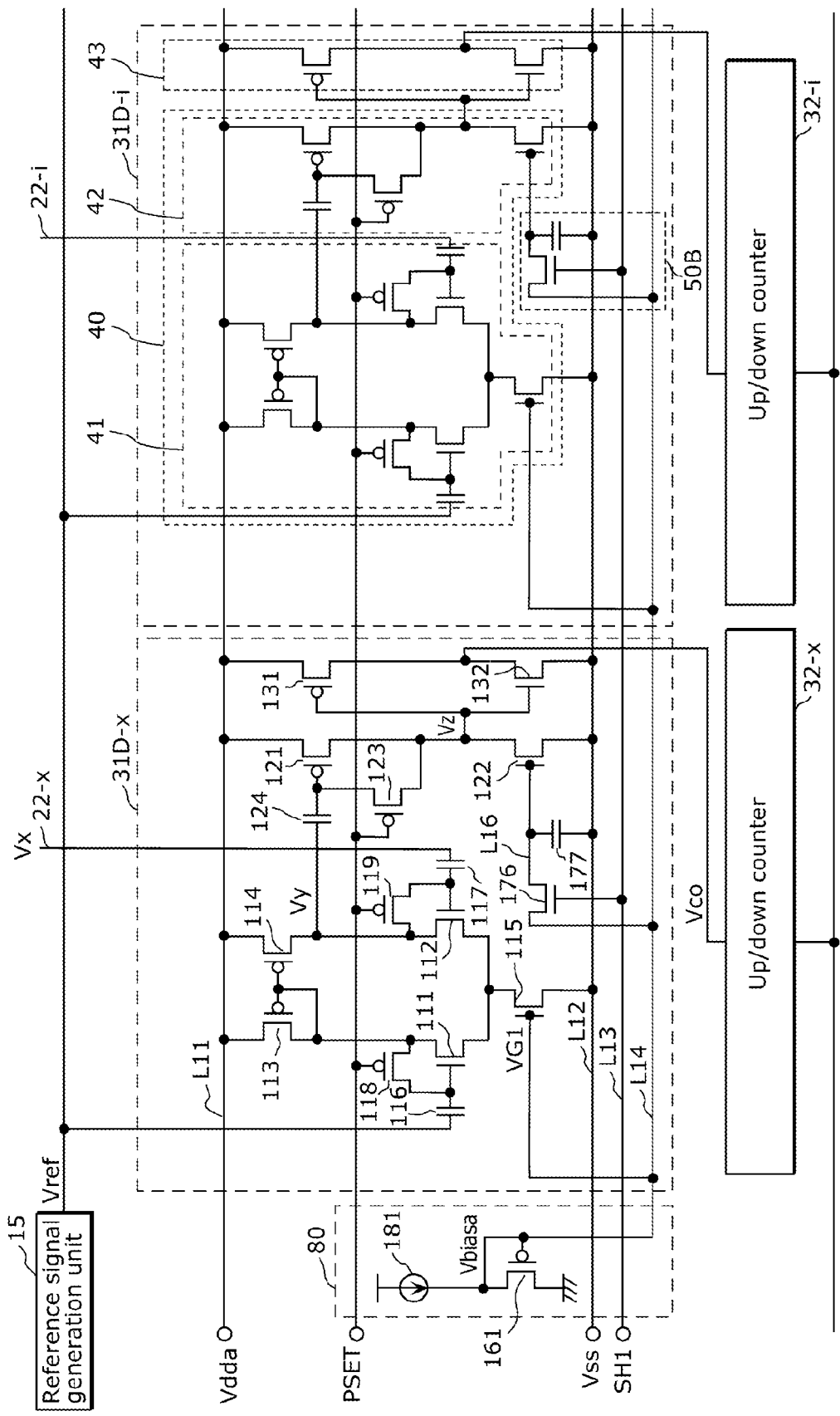
FIG. 10 is a circuit diagram of comparators according to a modification of the second embodiment.

For example, as in comparators 31D (31D-x, 31D-i) shown in FIG. 10, the sample-and-hold circuit 50B may be provided for only the gate of the constant current source transistor 122 of the inverting amplifier 42.

With this configuration, the gate of the constant current source transistor 122 is electrically isolated between the plurality of columns. Accordingly, when the output level of the inverting amplifier 42 in a given column fluctuates, it is possible to reduce the fluctuations in the gate voltages of the constant current source transistors 122 in the other columns. Specifically, even if the output signal of the comparator 31-i is inverted and the gate voltage of the constant current source transistor 122 in the ith column fluctuates, the gate voltages of the constant current source transistors 115 and 122 in the xth column do not fluctuate. Accordingly, it is possible to reduce transverse band-shaped noises as shown in FIGS. 7A and 7B.

Here, the output level of the inverting amplifier 42 fluctuates more significantly than that of the differential amplifier 41. In other words, the amount of fluctuations in the gate voltage of the constant current source transistor 122 is greater than the amount of fluctuations in the gate voltage of the constant current source transistor 115. Thus, it is possible to achieve both a reduced circuit size and an enhanced noise reduction effect by providing the sample-and-hold circuit only for the constant current source transistor 122, which has more significant effect on the constant current source transistors 115 and 122 in the other columns.

Third Embodiment

In a third embodiment of the present disclosure, a description will be given of a modification of the solid-state imaging device 10A according to the first embodiment described above.

Figure 11:
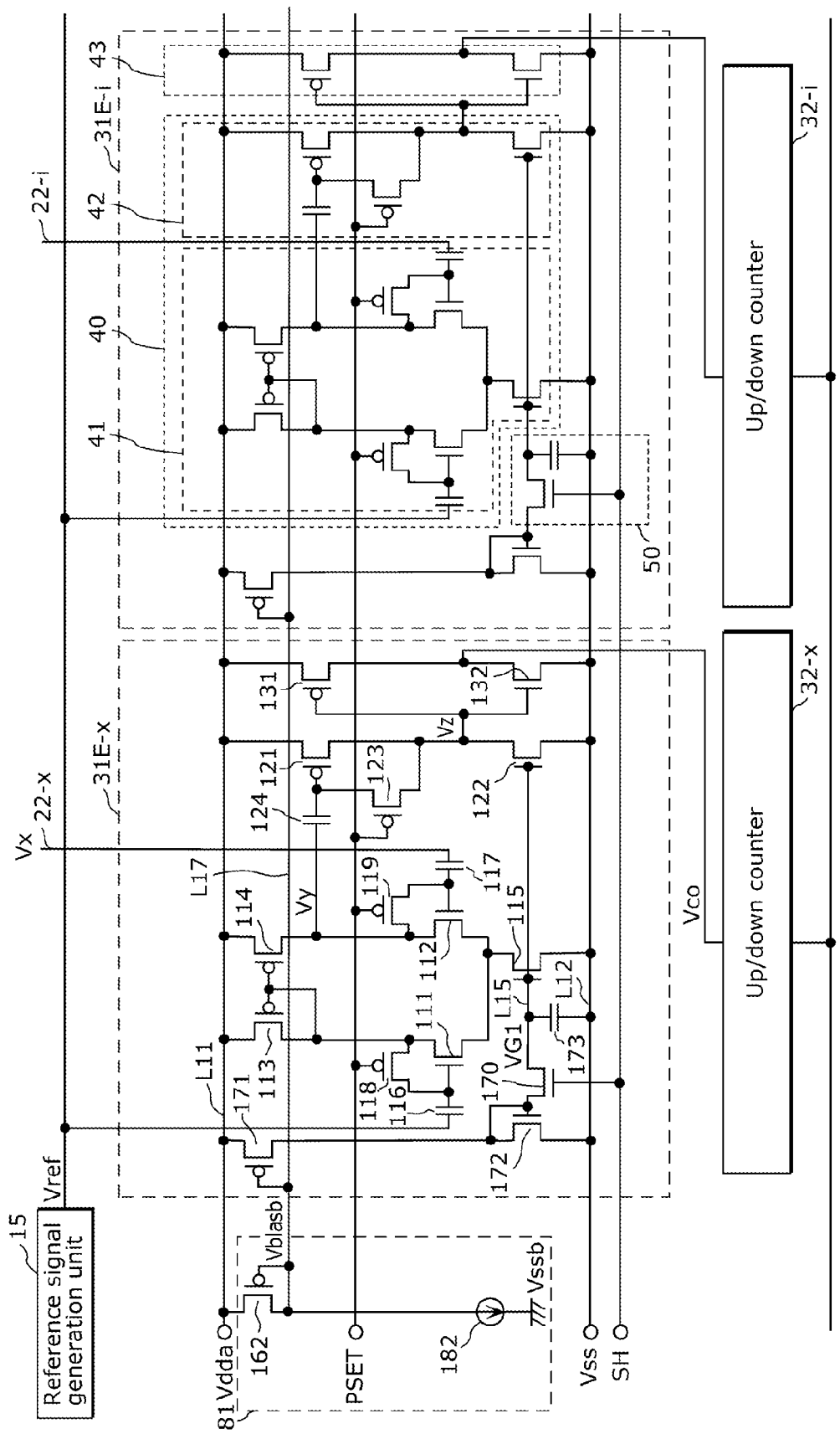
FIG. 11 is a circuit diagram of comparators according to a third embodiment of the present disclosure.

FIG. 11 is a circuit diagram showing the configuration of comparators 31E (31E-x, 31E-i) according to the third embodiment. In addition to the configuration of the comparators 31A shown in FIG. 3, the comparators 31E shown in FIG. 11 each further include a reference current source transistor 171 and a current mirror transistor 172. Furthermore, the solid-state imaging device according to the third embodiment includes a reference current source circuit 81 in place of the reference current source circuit 80 shown in FIG. 3.

The reference current source circuit 81 corresponds to the second reference current source unit according to the present disclosure, generates a voltage Vbiasb, and outputs the generated voltage Vbiasb to a bias line L17. The reference current source circuit 81 includes a transistor 162 and a reference current source 182 that supplies a reference current to the transistor 162. A ground potential Vssb is applied to the reference current source 182.

In the third embodiment, a current mirror circuit is provided in each comparator 31E. Also, a reference current source circuit is provided in each comparator 31E. The reference current source circuit in the comparator 31E corresponds to the first reference current source unit according to the present disclosure, and is composed of a reference current source transistor 171 and a current mirror transistor 172.

The reference current source transistor 171 constitutes a current mirror circuit together with the transistor 162 that supplies the bias voltage Vbiasb. The reference current source transistor 171 supplies a current to the current mirror transistor 172.

The current mirror transistor 172 is connected to the reference current source transistor 171, and constitutes a current mirror circuit together with the constant current source transistors 115 and 122. The current mirror transistor 172 generates a predetermined bias voltage based on the current supplied from the reference current source transistor 171. Then, that bias voltage is supplied to the gates of the constant current source transistors 115 and 122. Thus, a constant current is supplied to the differential amplifier 41 and the inverting amplifier 42.

Furthermore, in the present embodiment, an end of the sample-and-hold transistor 170 is connected to the current mirror transistor 172. Accordingly, the gates of the constant current source transistors 115 and 122 are electrically isolated between the plurality of columns not only when the control signal SH1 is in the state of L level, but also when the control signal SH1 is in the state of H level before the start of the pixel signal readout. Accordingly, it is possible to further reduce the effect of the horizontal stripe-shaped noise.

The gates of the constant current source transistors 115 and 122 are also electrically isolated between the plurality of columns when the control signal SH1 is in the state of L level during the AD conversion period. Accordingly, it is possible to reduce a noise commonly occurring to the plurality of columns. Thus, the solid-state imaging device according to the present embodiment can reduce a noise commonly occurring to the plurality of columns, and can therefore reduce horizontal stripe-shaped noises as shown in FIG. 8.

Although the present embodiment has illustrated an example in which the sample-and-hold transistor 170 is provided between the gate of the constant current source transistor 115 and the gate of the current mirror transistor 172 as shown in FIG. 11, it is sufficient that means for sampling and holding the bias voltage is provided for the gate of the constant current source transistor 115.

Figure 12:
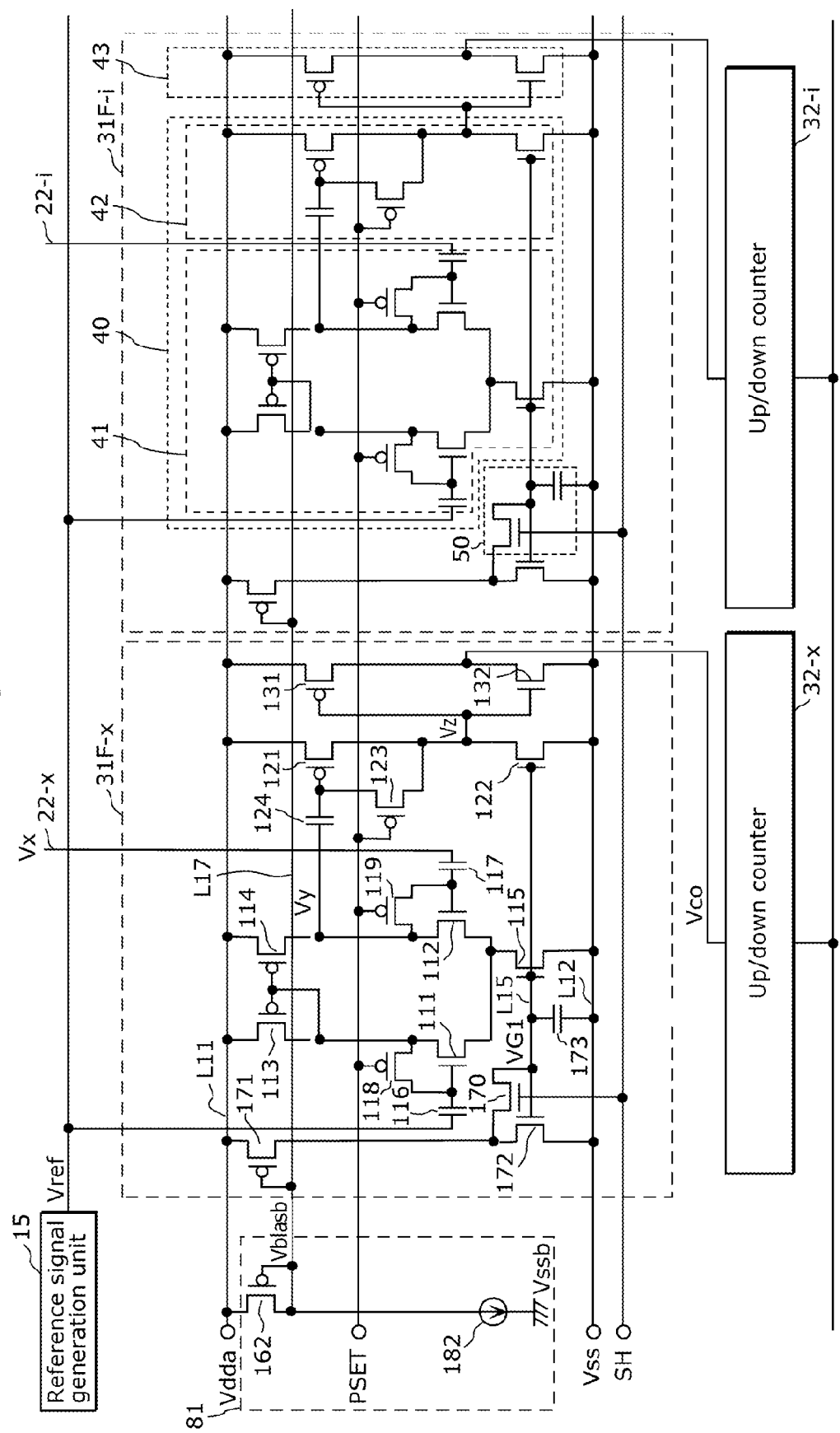
FIG. 12 is a circuit diagram of comparators according to a modification of the third embodiment.

For example, the sample-and-hold transistor 170 may be provided for the source and the gate of the current mirror transistor 172 as in comparators 31F (31F-x, 31F-i) shown in FIG. 12. In this case, by setting the control signal SH1 to H level, the bias voltage is applied to the gate of the constant current source transistor 115. Thereafter, by setting the control signal SH1 to L level, the bias voltage is held in the sample-and-hold circuit 50.

Fourth Embodiment

While the first to third embodiments have described examples in which the present disclosure is applied to the comparators included in the AD converter, a description will be given of an example in which the same technology is applied to a signal amplifier provided for each column in the fourth embodiment. Note that the present disclosure is applicable to amplifiers in general that include constant current source transistors whose sources are commonly connected.

Figure 13:
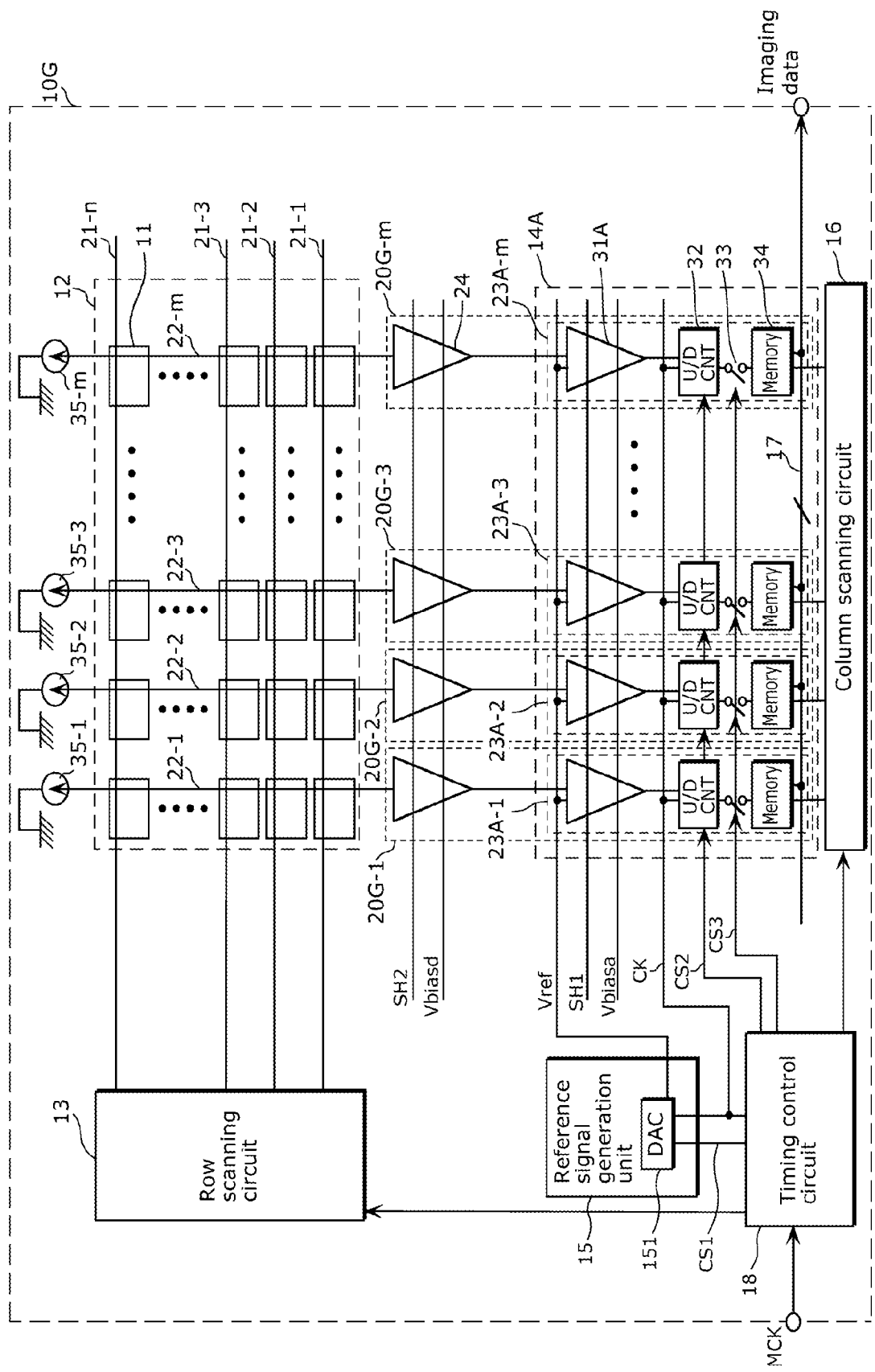
FIG. 13 is a block diagram showing a configuration of a solid-state imaging device according to a fourth embodiment of the present disclosure.
Figure 14:
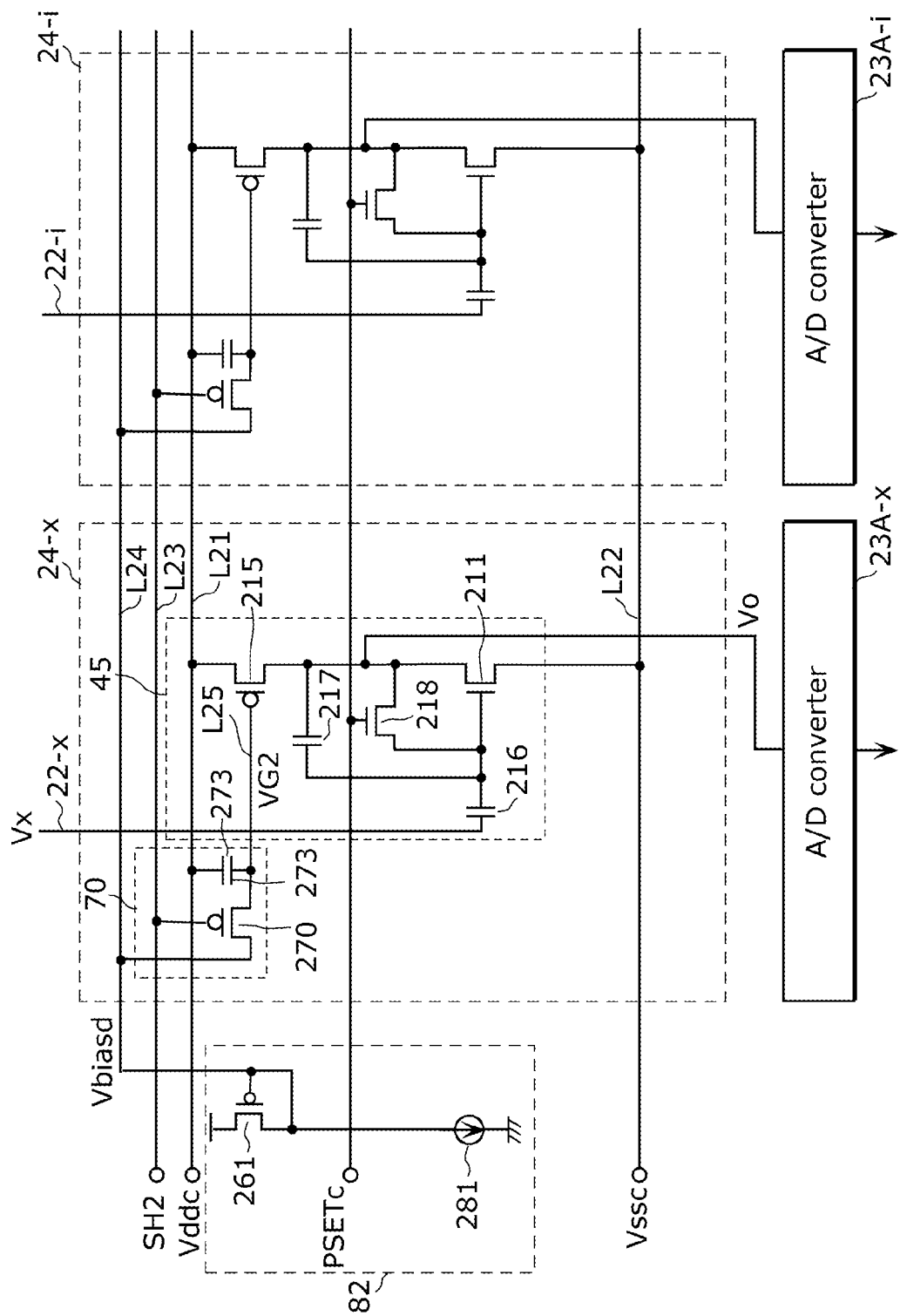
FIG. 14 is a circuit diagram of signal amplifiers according to the fourth embodiment.

FIG. 13 is a block diagram showing the configuration of a solid-state imaging device 10G according to the fourth embodiment. FIG. 14 is a circuit diagram showing an exemplary circuit configuration of signal amplifiers 24 according to the fourth embodiment.

The solid-state imaging device 10G according to the fourth embodiment is characterized in that column circuits 20G each include, between a vertical signal line 22 and a column-parallel AD converter 23A, a signal amplifier 24 that amplifies an analog signal (signal voltage Vx) output from each pixel, and that a sample-and-hold circuit 70 is provided for the constant current source in the signal amplifier 24 as shown in FIG. 14.

The signal amplifiers 24 (24-x, 24-i) each include an amplifier 45 and a sample-and-hold circuit 70.

The amplifier 45 is a single-ended grounded-source inverting amplifier, for example. The amplifier 45 includes an input capacitor 216 into which the signal voltage Vx is input, a feedback capacitor 217, an amplifying transistor 211 that amplifies the input signal, a constant current source transistor 215 that supplies a current to the amplifying transistor 211, and a reset transistor 218 that resets the input and output of the signal amplifier 24.

The reset transistor 218 is connected between the gate and the drain of the amplifying transistor 211, and a set signal PSETc is selectively provided to the gate of the reset transistor 218.

The signal amplifier 24 is characterized by including a sample-and-hold circuit 70 that samples and holds a bias voltage Vbiasd supplied to the gate electrode of the constant current source transistor 215. The sample-and-hold circuit 70 includes a sample-and-hold transistor 270 and a sample-and-hold capacitor 273. The sample-and-hold circuit 70 holds the bias voltage Vbiasd during a period in which the signal amplifier 24 amplifies the signal voltage Vx. Furthermore, the sample-and-hold circuit 70 samples the bias voltage Vbiasd outside the period in which the signal amplifier 24 amplifies the signal voltage Vx.

The sample-and-hold capacitor 273 is connected between a bias line L25 electrically connected to the gate of the constant current source transistor 215 and a power supply voltage line L21. The sample-and-hold transistor 270 is connected between the gate of the constant current source transistor 215 and a bias line L24 to which the voltage Vbiasd is supplied. Furthermore, a control signal SH2 is applied to the gate of the sample-and-hold transistor 270.

Additionally, the solid-state imaging device 10G includes a reference current source circuit 82. The reference current source circuit 82 generates the voltage Vbiasd, and outputs the generated voltage Vbiasd to the bias line L24. The reference current source circuit 82 includes a transistor 261 and a reference current source 281 that supplies a reference current to the transistor 261.

A power supply voltage Vddc is applied to the power supply voltage line L21, and a ground potential Vssc is applied to the ground line L22.

Next, the operations of the solid-state imaging device 10G will be described with reference to the timing chart shown in FIG. 15.

Note that the specific operations of the pixel cells 11 and the row scanning circuit 13 are the same as those in the first embodiment, and therefore the description thereof has been omitted.

When a given row k is selected by row scanning performed by the row scanning circuit 13, the set signal PSETc becomes active (H level). Thereby, the operating point of the amplifying transistor 211 is determined. After the first readout operation from the pixel cells 11 in the selected row k to the vertical signal lines 22-1 to 22-m is stabilized, the set signal PSETc becomes inactive (L level). When the set signal PSETc is inactive (at L level), the signal amplifier 24 amplifies the analog signals output from the pixel cells 11. The amplifier 45 of the present embodiment is an inverting amplifier, and thus the output signal Vo of the amplifier 45 is inverted and amplified in response to the fluctuation of the signal voltage Vx as shown in FIG. 15. Therefore, the polarity of the comparator 31A in the timing chart is inverted relative to the polarity in the first embodiment.

Next, a description will be given of the timing at which the output signal Vo of the signal amplifier 24 is AD-converted. The stepped-wave reference signal Vref is provided from the DAC 151 to the respective comparators 31A of the AD converters 23-1 to 23-m. Thereby, the operation of comparing the input voltage of the differential pair transistor 112 that is determined by the signal amplifier 24 with the input voltage of the differential pair transistor 111 that is determined from the stepped-wave reference signal Vref is performed in the differential amplifier 41.

Note that this AD conversion operation is the same as the AD conversion operation described in the first embodiment above, except that the signal voltage Vx is replaced by the output signal Vo of the signal amplifier 24, and therefore the description thereof has been omitted.

The present embodiment is characterized in that, at least within the AD conversion period, the bias voltage Vbiasd supplied to the plurality of signal amplifiers 24 that are respectively disposed for the columns is sampled and held in accordance with the control signal SH2.

Then, as shown in FIG. 15, by controlling the control signal SH2 to L level before the start of the pixel signal readout in which the signal voltage Vx changes, the sample-and-hold transistor 270 is turned on. Consequently, the bias voltage Vbiasd is supplied from the reference current source circuit 82 to the gate of the constant current source transistor 215 and the sample-and-hold capacitor 273.

Here, the transistor 261 that supplies the bias voltage Vbiasd constitutes a current mirror circuit together with the constant current source transistor 215. Accordingly, a constant current is supplied to the signal amplifier 24 so as to mirror the current supplied from the reference current source 281. For example, by setting the W/L size ratio between the transistor 261 and the constant current source transistor 215 to m:1, the signal amplifier 24 can pass a constant current in an amount of 1/m the current supplied from the reference current source 281.

Thus, in the solid-state imaging device 10G according to the present embodiment, the transistor 261 constitutes a current mirror circuit together with the constant current source transistor 215. Accordingly, even if the characteristics of the constant current source transistor 215 of the signal amplifier 24 fluctuate owing to manufacturing variations and changes in temperature, it is possible to accurately set the current flowing through the signal amplifier 24. In other words, the solid-state imaging device 10G can reduce fluctuations in characteristics of the signal amplifier 24 caused by manufacturing variations and changes in temperature.

Moreover, by simultaneously controlling the control signals SH2 supplied to the plurality of columns to L level, it is possible to supply the bias voltage Vbiasd to the gates of the constant current source transistors 215 disposed in the plurality of columns, simultaneously for the plurality of columns. This enables the bias voltage Vbiasd to be supplied to the plurality of constant current source transistors 215 in a short period.

Particularly, in the case of a solid-state imaging device suitable for application to a digital video camera, a digital still camera or the like, several thousands of sample-and-hold circuits 70 are provided in the column direction. Accordingly, when a bias voltage is sequentially held for each column, there is a problem in that the frame rate (the number of frames) at which an image signal is output excessively drops. According to the present embodiment, the bias voltage Vbiasd can be simultaneously supplied to the plurality of columns as described above, and it is therefore possible to significantly reduce the drop in the frame rate (the number of frames).

Then, the sample-and-hold transistor 270 is turned off by controlling the control signal SH2 from H level to L level. When the sample-and-hold transistor 270 is turned off, the bias voltage Vbiasd supplied from the reference current source circuit 82 is electrically isolated for each column. Thereby, the bias voltage Vbiasd is sampled and held in the sample-and-hold capacitor 273. For example, each of the voltages VG2 of the xth column and the ith column as shown in FIG. 14 is maintained at the voltage level of the bias voltage Vbiasd. This enables the signal amplifier 24 to continuously supply a constant current.

Next, upon completion of the AD conversion as shown in FIG. 15, the control signal SH2 is controlled from H level to L level. Thereby, the sample-and-hold transistor 270 is turned on again. Accordingly, it is possible to supply the bias voltage Vbiasd from the reference current source circuit 82 to the gate of the constant current source transistor 215 and the sample-and-hold capacitor 273.

Here, a consideration will be given of a circuit noise resulting from fluctuations in voltage of the power supply voltage line and the ground line.

As an example of the noise reduction, let us assume a situation in which the input signal of the signal amplifier 24-$i$ in the ith column fluctuates and the input signal in the xth column does not fluctuate.

When the voltage level of a signal input into the signal amplifier 24-$i$ fluctuates, a charge/discharge current is generated in the constant current source transistor 215 or the amplifying transistor 211 that are included in the signal amplifier 24-I, according to the voltage level.

Figure 16A:
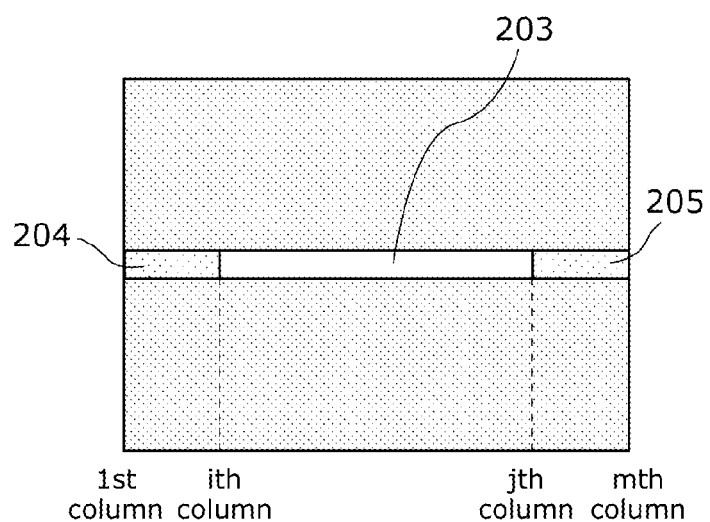
FIG. 16A shows an example of noise generation according to the fourth embodiment.
Figure 16B:
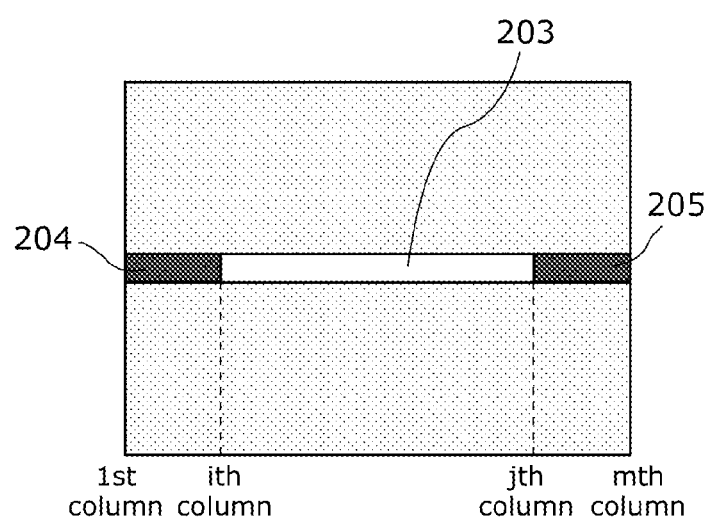
FIG. 16B shows an example of noise generation according to the fourth embodiment.

Here, a description will be given of an example of an image in which a subject 203 that is brighter than the surrounding exists in the ith to jth columns as shown in FIGS. 16A and 16B. In this case, the output signals of the signal amplifiers 24 in the ith to jth columns significantly fluctuate. Consequently, the constant current source transistors 215 or the amplifying transistors 211 in the ith to jth columns become unable to operate in a saturated region, so that the currents flowing through these transistors significantly fluctuate. Thereby, the voltage of the ground line L22 or the power supply voltage line L21 fluctuates. As a result, as shown in FIGS. 16A and 16B, a white band-shaped noise or a black band-shaped noise is generated in a region 204 extending from the first column to the i−1th column and a region 205 extending from the j+1th column to the mth column, which are located on the right and the left, respectively, of the brighter subject 203.

As described above, assuming a situation in which the output signal of the signal amplifier 24 in a given column significantly fluctuates and the output level of the immediately adjacent signal amplifier 24 is small, the current flowing through the amplifier 45 of the signal amplifier 24 whose output level is small changes as a result of the effect of the voltage fluctuations of the ground line L22. This effect appears in an image as a circuit noise. Particularly, in a CMOS solid-state imaging device including a column-parallel AD conversion device, there is one comparator per column, for example. Consequently, the fluctuation of the power supply voltage line L21 when the comparators are inverted all at once becomes significant, resulting in a problem, for example, in the form of transverse band-shaped circuit noises as shown in FIGS. 16A and 16B.

The effect of the transverse band-shaped circuit noises as shown in FIGS. 16A and 16B is more prominent when a grounded-source signal amplifier 24 having a high gain is used. One reason for this is as follows. When the signal amplifier 24 has a high gain, the output signal of the amplifier 45 significantly fluctuates even if the input level is low. Accordingly, even if no high-intensity light is incident, the constant current source transistor 215 or the amplifying transistor 211 becomes inoperable in a saturated region.

Another reason is as follows. In the case of a grounded-source signal amplifier 24, increasing the gain results in a narrower band. That is, even if the constant current source transistor 215 or the amplifying transistor 211 does not operate in a saturated region, the period required to stabilize the output signal increases because of the narrower band. Accordingly, the period during which the voltage of the ground line L12 fluctuates, or in other words, the period during which the current flowing through the amplifier 45 changes increases. This makes the effect of the transverse band-shaped circuit noises more prominent.

In the signal amplifier 24 according to the present embodiment, the circuit noise caused by the fluctuations in voltage of the power supply or the ground is reduced by providing the reference current source circuit 82 and the sample-and-hold circuit provided for each signal amplifier 24. Specifically, the solid-state imaging device 10G reduces this circuit noise by sampling and holding the bias voltage Vbiasd supplied from the reference current source circuit 82 for each column. This function will be specifically described.

As an example of the noise reduction, let us assume a situation in which the output signal of the ith column significantly fluctuates and the voltage level of the signal voltage of the xth column is small. As a result of the output signal of the ith column significantly fluctuating, the voltage of the power supply voltage line L21 fluctuates. When the amount of this fluctuation is taken as $\Delta V$, the voltage of the power supply voltage line L21 of the signal amplifier 24-$x$ in the xth column also fluctuates by $\Delta V$.

In contrast, according to the present embodiment, before the output signal of the signal amplifier 24-$i$ in the ith column significantly fluctuates, the bias voltage Vbiasd is held in the sample-and-hold circuit 70 in the xth column. Consequently, the bias voltage Vbiasd is applied to the gate of the constant current source transistor 215 in the xth column, and the power supply voltage Vddc is applied to the source thereof. Accordingly, the constant current source transistor 215 generates a current depending on the gate-source voltage difference Vgs= (Vbaisd−Vddc) as shown in Expression 1.

In the present embodiment, the control signal SH2 is controlled to H level during the AD conversion period. Accordingly, the sample-and-hold transistor 270 in the xth column is turned off, and a voltage Vbiasd−Vddc is held in the sample-and-hold capacitor 273 in the xth column. In other words, even if the voltage of the power supply voltage line L21 connected to the sample-and-hold capacitor 273 fluctuates by $\Delta V$, the voltage difference between both ends of the sample-and-hold capacitor 273 in the xth column is held. Accordingly, the voltage VG2 of the bias line L25 connected to the sample-and-hold capacitor 273 in the xth column is Vbiasd+ΔV. In other words, when the source voltage of the constant current source transistor 215 in the xth column fluctuates from Vddc to Vddc+ΔV, the gate voltage VG2 of the constant current source transistor 215 in the xth column is Vbiasd+ΔV as described above. Here, the constant current source transistor 215 supplies a current depending on the gate-source voltage difference Vgs as shown in Expression 1. Since the gate voltage Vg is Vbiasd+ΔV and the source voltage Vs is Vddc+ΔV, the gate-to-source voltage Vgs can be represented by Expression 4 below.

$$Vgs=Vg-Vs=(Vbiasd+\Delta V)-(Vddc+\Delta V)=Vbias-Vddc \quad \text{Expression 4}$$

That is, even if the voltage of the power supply voltage line L21 fluctuates by ΔV, the gate-to-source voltage Vgs of the constant current source transistor 215 in the xth column does not change. Thus, the solid-state imaging device 10G according to the present embodiment can continuously supply a constant current to the signal amplifier 24 even if the voltage of the power supply voltage line L21 fluctuates by ΔV. That is, the solid-state imaging device 10G according to the present embodiment can continuously supply a constant current to the signal amplifier 24 by the function of the sample-and-hold transistor 270 and the sample-and-hold capacitor 273 included in the sample-and-hold circuit 70, without being affected by the voltage fluctuation ΔV of the power supply voltage line L21.

Thus, the solid-state imaging device 10G according to the present embodiment can continuously supply a constant current to the signal amplifier 24-x having a small output signal because the current of the signal amplifier 24-x does not fluctuate even if the voltage of the power supply voltage line L21 fluctuates as a result of the significant fluctuation of the voltage level of the output signal of the signal amplifier 24-i. Accordingly, it is possible to reduce transverse band-shaped noises as shown in FIGS. 16A and 16B.

Furthermore, according to the present embodiment, the control signal SH2 is controlled to H level during the AD conversion period. Accordingly, it is possible to cancel the noise generated by the transistor 261 and the reference current source 281 that supplies the reference current, which constitute the reference current source circuit 82. This function will be described with reference to the timing chart shown in FIG. 15.

The voltage VG2 shown in FIG. 15 indicates the bias voltage supplied to the gate of the constant current source transistor 215. The solid line indicates the bias voltage VG2 in the present embodiment, and the dotted line indicates a voltage VG2 in the case of not using the sample-and-hold circuit 70.

As shown in FIG. 15, in the case of not using the sample-and-hold circuit 70, the bias voltage VG2 fluctuates during the AD conversion period as a result of the effect of the noise of the reference current source circuit 82. Examples of the high-frequency noises that cause the fluctuation of the voltage VG2 include a thermal noise and a 1/f noise of the transistor constituting the reference current source circuit 82. Examples of the low-frequency noises the cause the above-described fluctuation include the fluctuation of the bias voltage Vbiasd caused by the fluctuation of the ground potential of the reference current source circuit 82 during the AD conversion period. Examples of the causes of this ground potential fluctuation include the current fluctuation caused by the current fluctuation of the signal amplifier 24 during the AD conversion period and the current fluctuation caused by the pixel signal readout circuit composed of the amplifying transistor 104 and the constant current source transistor 142.

When the voltage VG2 supplied to the gate of the constant current source transistor 215 fluctuates during the AD conversion period, the current supplied to the signal amplifier 24 fluctuates, resulting in a noise. Specifically, in the case of not holding or sampling the bias voltage supplied to the gate of the constant current source transistor 215, the bias voltage Vbiasd is commonly applied to the gates of the constant current source transistors 215 in the plurality of columns. Consequently, a common noise is generated in the signal amplifiers 24 in the plurality of columns, resulting in a horizontal stripe-shaped noise. As shown in FIG. 8, a horizontal stripe-shaped noise is generated in the shape of a horizontal stripe in an image, and thus is more easily recognized than a noise that is randomly generated in a space. Accordingly, this noise causes a significant deterioration in image quality even if the noise level is small.

In contrast, according to the present embodiment, the bias voltage Vbiasd is sampled and held by the sample-and-hold circuit 70 provided for each column. Additionally, the gate voltage VG2 of each column is electrically isolated from the bias voltage Vbiasd supplied from the reference current source circuit 82. Accordingly, it is possible to suppress the effect of the noise of the bias voltage supplied from the reference current source circuit 82 on the constant current source transistor 215 in each column during the AD conversion period. Moreover, each of the gates of the constant current source transistors 215 in the respective columns is electrically isolated. Thus, even if a noise is generated in the bias voltage held in the sample-and-hold circuit 70 in a given column, it is possible to inhibit the noise from affecting the bias voltages of the other columns. Accordingly, it is possible to reduce the generation of a horizontal stripe-shaped noise, which is easily recognized.

Furthermore, according to the present embodiment, it is possible to reduce the effect of the noise of the bias voltage supplied from the reference current source circuit 82 before sampling and holding. This function will be described with reference to FIG. 15.

The control signal SH2 becomes L level before the start of the pixel signal readout, and thereby the bias voltage Vbiasd supplied from the reference current source circuit 82 is supplied to the gate of the constant current source transistor 215. It is assumed that, at this time, a noise ΔVN1 has generated in the bias voltage Vbiasd supplied from the reference current source circuit 82.

Then, the control signal SH2 is switched from L level to H level. Thereby, a bias voltage Vbiasd+ΔVN1 is held in the sample-and-hold circuit 70.

It is assumed that the noise ΔVN1 has caused the reset component ΔV to fluctuate to ΔV+ΔVN2.

In the present embodiment, as described above, the up/down counter 32 performs a down-counting operation as the first counting operation and an up-counting operation as the second counting operation in the AD conversion operation. Thereby, the subtraction processing (Second comparison period)−(First comparison period) is automatically performed in the up/down counter 32.

Specifically, the following equation holds: (Second comparison period)−(First comparison period)=(Signal component Vsig+Reset component ΔV+ΔVN2+Offset component of AD converter 23A)−(Reset component ΔV+ΔVN2+Offset component of AD converter 23A)=(Signal component Vsig). That is, the noise £VN2 is also removed by the two readout operations and the subtraction processing in the up/down counter 32.

Thus, according to the present embodiment, by sampling and holding the bias voltage supplied from the reference current source circuit 82 during the AD conversion period, even if a noise is generated in the bias voltage supplied from the reference current source circuit 82, the effect of this noise can be reduced by CDS processing.

Fifth Embodiment

A solid-state imaging device according to a fifth embodiment of the present disclosure is characterized by bringing a comparator that has completed a comparison operation to a power-down state, in addition to having the characteristics of the solid-state imaging device according to the first embodiment described above. Accordingly, it is possible to reduce the power consumed in the comparator.

Figure 17:
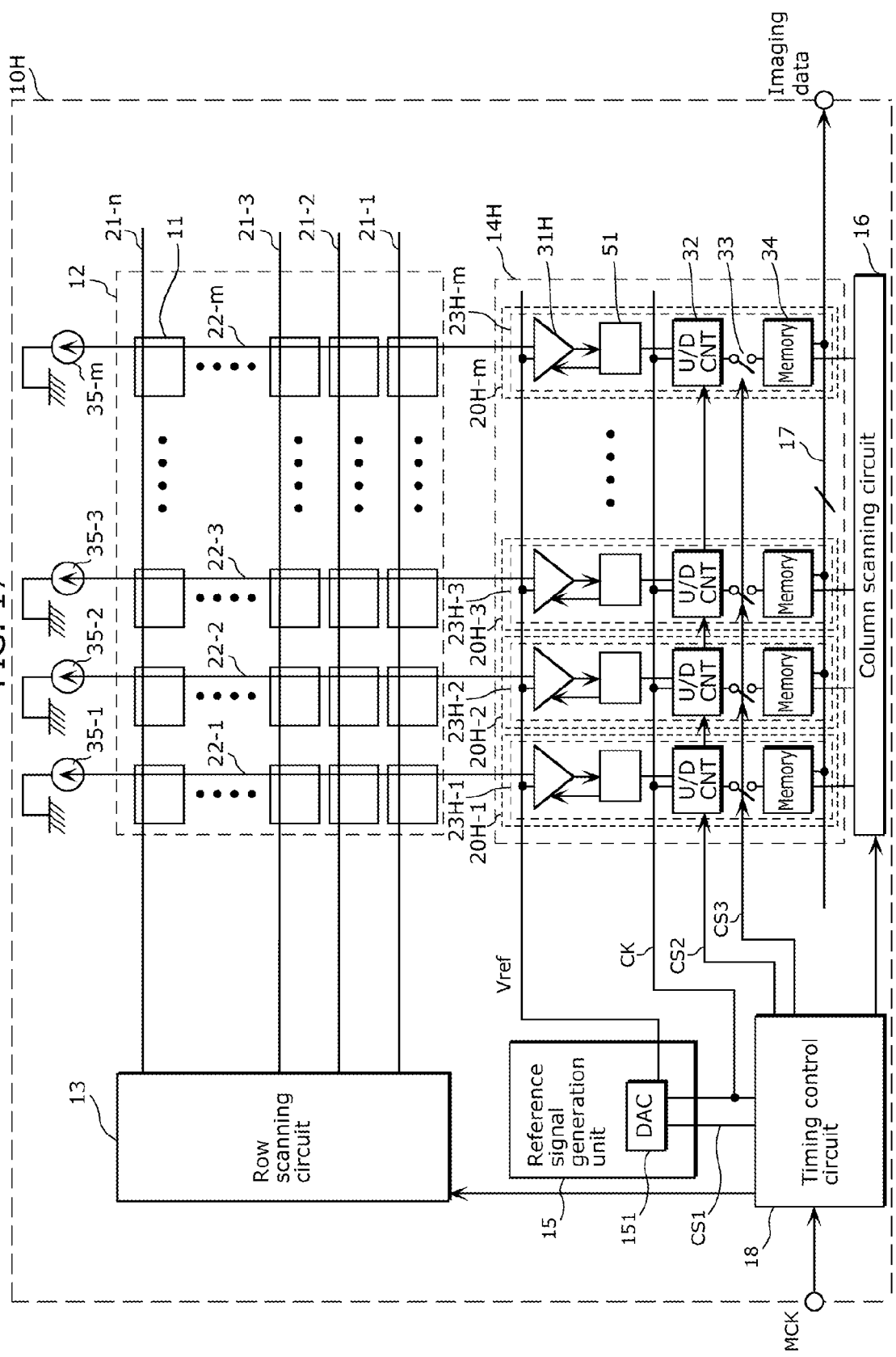
FIG. 17 is a block diagram showing a configuration of a solid-state imaging device according to a fifth embodiment of the present disclosure.

FIG. 17 is a block diagram showing the configuration of a solid-state imaging device 10H according to the fifth embodiment. The solid-state imaging device 10H according to the fifth embodiment is further characterized in that AD converters 23H (column circuits 20H) included in a column processing unit 14H each include a power-down control unit 51, in addition to having the configuration of the solid-state imaging device 10A according to the first embodiment described above. Each of the power-down control units 51 is disposed between a comparator 31H and an up/down counter 32, and controls the current flowing through the comparator 31H.

Figure 18:
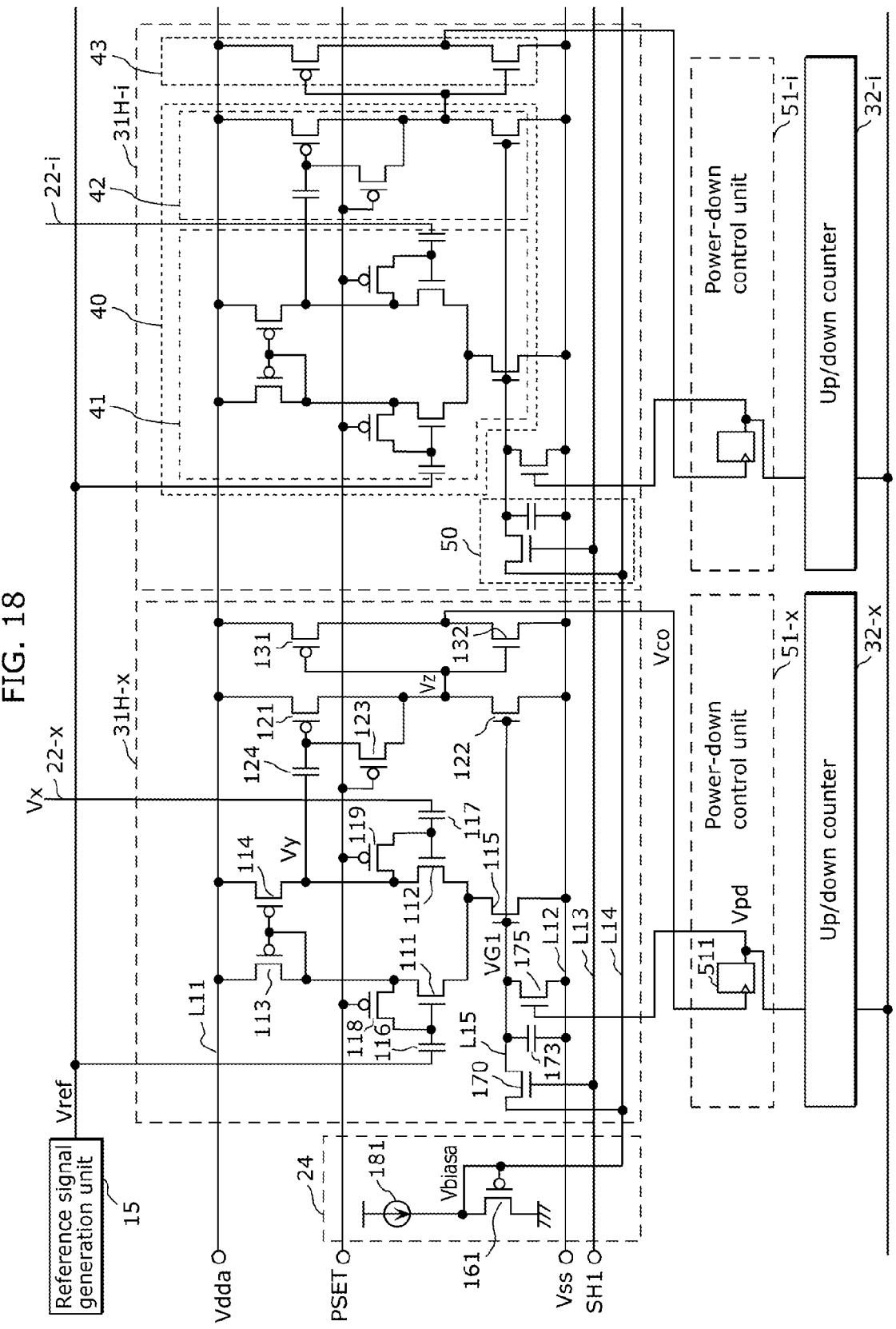
FIG. 18 is a circuit diagram of comparators according to the fifth embodiment.

FIG. 18 is a circuit diagram of the comparators 31H and the power-down control units 51.

Each of the comparators 31H shown in FIG. 18 further includes, in addition to the configuration of the comparator 31A according to the first embodiment, a transistor 175 for controlling the current of the comparator 31H. The transistor 175 is connected between the gates of the constant current source transistors 115 and 122 and the ground line L12.

The power-down control units 51 each include a flip-flop 511, and controls a power-down signal Vpd to H level at the timing at which the output signal Vco from the comparator 31H is inverted from L level to H level. The power-down signal Vpd is input into the comparator 31H. When the power-down signal Vpd is at L level, the comparator 31H is in the operating state. When the power-down signal Vpd is at H level, the comparator 31H is in the stopped state (power-down state). That is, the power-down control unit 51 stops the supply of power to the comparator 31H at the timing at which the output signal Vco is inverted from H level to L level. Specifically, the power-down control unit 51 stops the supply of a drive current to the comparator 31H.

More specifically, the transistor 175 is turned on when the power-down signal Vpd becomes H level. Thereby, the constant current source transistors 115 and 122 are turned off. Consequently, no drive current is supplied to the differential amplifier 41 and the inverting amplifier 42 that constitute the comparator 31H, so that the comparator 31H is brought into the stopped state.

As an example of the noise reduction, let us assume a case where, in a situation in which the output signal of the comparator 31H-x in the xth column has not yet been inverted, the output signal of the comparator 31H-i in the ith column is inverted. As a result of the output signal of the comparator 31H-i in the ith column being inverted, the current of the amplifier 40 in the ith column stops. Thereby, the voltage of the ground line L12 fluctuates. When the amount of this fluctuation is taken as ΔV, the voltage of the ground line L12 of the comparator 31H-x in the adjacent column, i.e., the xth column, also fluctuates by ΔV.

Even in such a case, as with the first embodiment described above, during the AD conversion period, the gate of the constant current source transistor 115 in the xth column and the gate of the constant current source transistor 115 in the ith column are electrically isolated from each other, and each of the gate voltages VG1 of the ith column and the xth column is sampled and held. Accordingly, the current mirror circuit formed by the reference current source transistor 171 and the current mirror transistor 172 in the xth column can supply a constant current to the amplifier 40 in the xth column, without being affected by the voltage fluctuation of the ground line L12 caused by the amplifier 40 in the ith column. Accordingly, it is possible to reduce noises as shown in FIGS. 7A and 7B.

Figure 19:
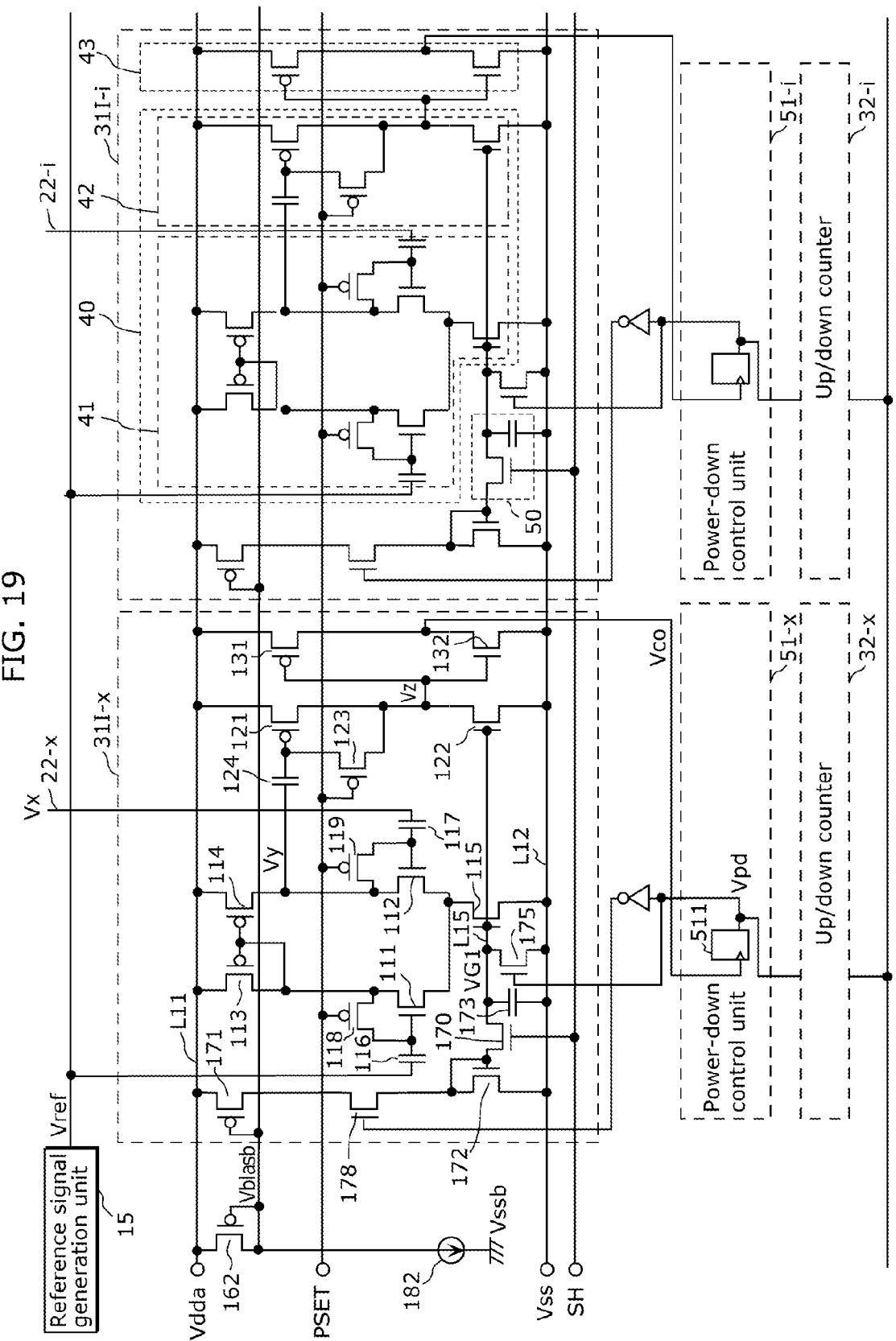
FIG. 19 is a circuit diagram of comparators according to a modification of the fifth embodiment.

Note that the configuration of the comparators 31H is not limited to the configuration shown in FIG. 18, and may be any configuration having the same function. For example, a transistor 178 may be provided in the current mirror circuit, as in comparators 31I shown in FIG. 19. In this configuration, when the power-down signal Vpd becomes H level, the transistor 175 is turned on and the transistor 178 is turned off. Thereby, the current mirror transistor 172 and the constant current source transistors 115 and 122 are turned off. Consequently, no drive current is supplied to the amplifier 40 included in each comparator 31I, so that the comparator 31I is brought into the stopped state.

The first to fifth embodiments have described cases where the sample-and-hold circuit includes a sample-and-hold capacitor that holds a bias voltage. This sample-and-hold capacitor may be a dedicated capacitive element. Alternatively, a parasitic capacitor may be used as a sample-and-hold capacitor. The parasitic capacitor includes the capacitance between the gate of the constant current transistor and the substrate, and the gate-source capacitance.

Although the first to fifth embodiments have described cases where the AD converters each including the comparator are disposed in the same number as the number of pixel columns according to the pixel pitch, or in other words, disposed in one-to-one correspondence with the pixel columns, the present disclosure is not limited to this application example. That is, one AD converter may be disposed for a plurality of vertical signal lines 22. In this case, this AD converter AD-converts signal voltages that are output to the corresponding plurality of vertical signal lines 22 in a time-division manner.

Although each of the above embodiments has described a case where pixel signals (analog signals) that are output from the pixel cells 11 through the vertical signal lines 22-1, 22-2, . . . , 22-m are subjected to AD conversion or signal amplification in the column circuit, this is merely an example. For example, the present disclosure is applicable to a case where at least one of a signal amplifier and an AD converter is built into each of the plurality of pixel cells 11. In this case, the same technique as that of the AD converter and the signal amplifier described above may be applied to at least one of the signal amplifier and the AD converter built into each pixel cell 11.

Although the above embodiments have described cases where the AD converter obtains a digital signal by measuring time, this is merely an example. The present disclosure is also applicable to an AD converter having a different configuration. Furthermore, the present disclosure is applicable to signal amplifiers and AD converters in general that include one or a plurality of amplifiers disposed for each column and in which the sources of constant current source transistors in the amplifiers are commonly connected between the plurality of columns.

Although each of the above embodiments has described, as an example, a solid-state imaging device such as a MOS image sensor that detects a light quantity distribution of the image light from a subject as a physical quantity distribution on a pixel-by-pixel basis, the present disclosure is not limited to this application example. For example, the present disclosure is similarly applicable to solid-state imaging devices in general, other than MOS image sensors, that use the X-Y address method and are equipped with a column-parallel amplifier or a column-parallel AD conversion device. Furthermore, the present disclosure is applicable to overall physical quantity distribution detection apparatuses suitable for detecting physical quantity distributions that use the X-Y address method and are equipped with a column-parallel amplifier or a column-parallel AD conversion device.

Sixth Embodiment

In a sixth embodiment of the present disclosure, a description will be given of an imaging apparatus including the solid-state imaging device according to any one of the first to fifth embodiments described above. The imaging apparatus is, for example, a digital video camera, a digital still camera, or a camera module for a mobile device such as a mobile phone.

Figure 20:
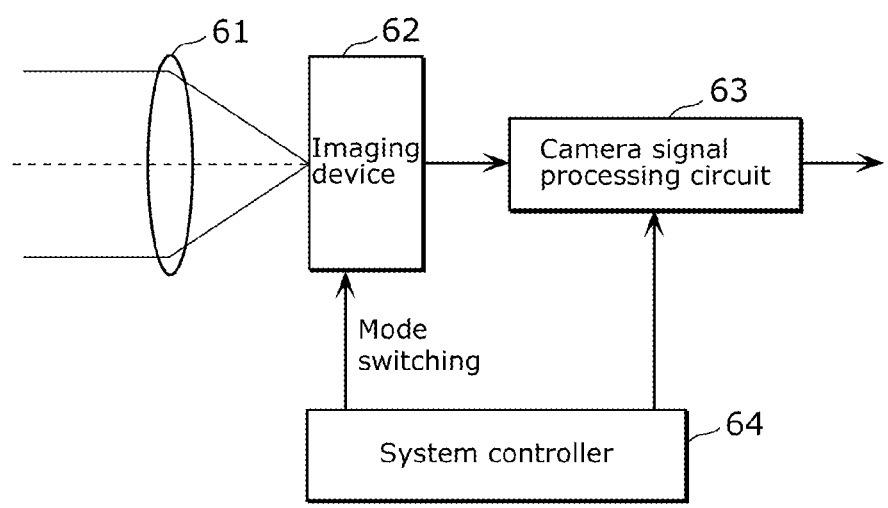
FIG. 20 is a block diagram showing an exemplary configuration of an imaging apparatus according to a sixth embodiment of the present disclosure.
Figure 21:
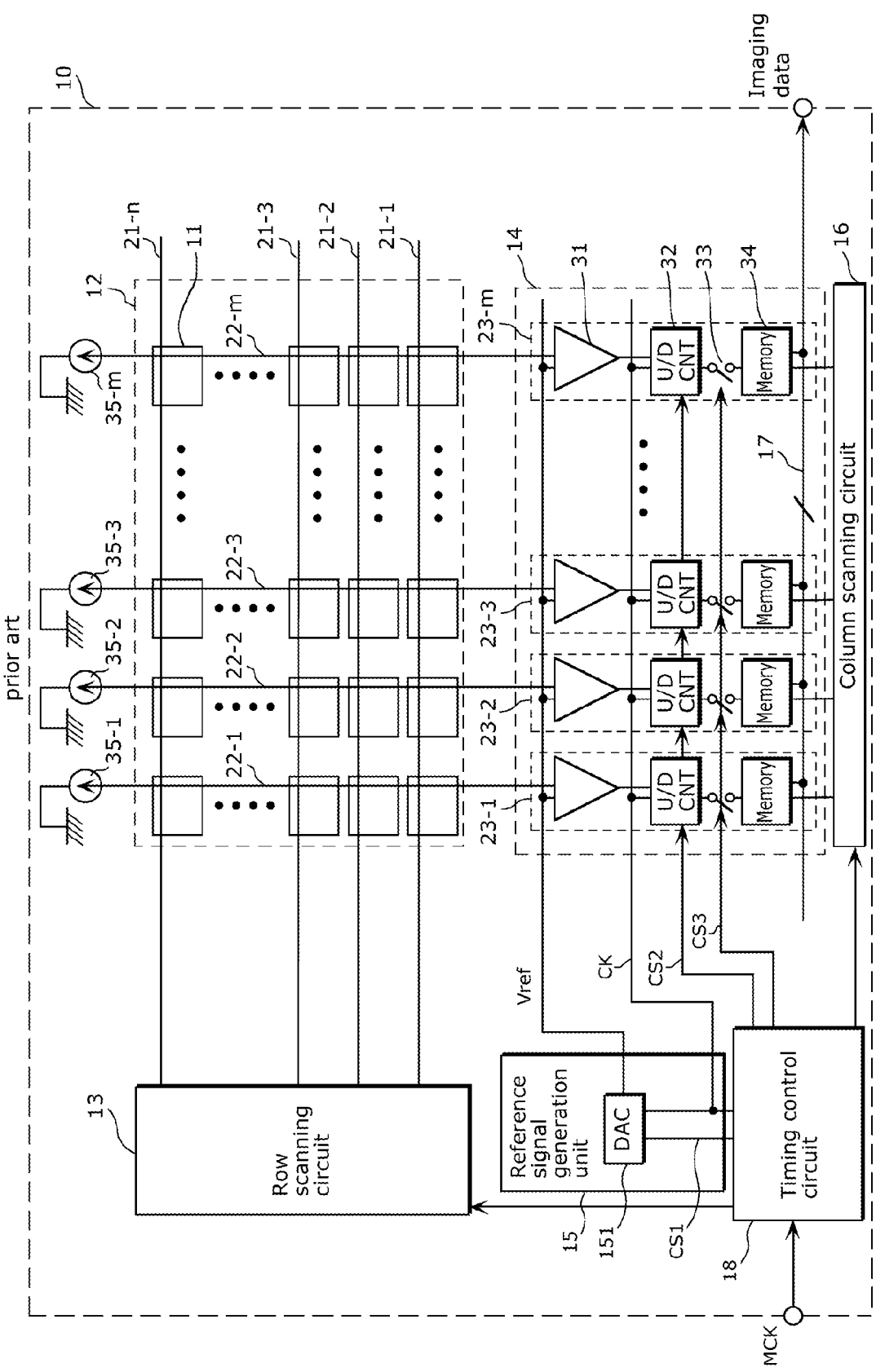
FIG. 21 is a circuit diagram showing an exemplary circuit configuration of conventional comparators.

FIG. 20 is a block diagram showing an exemplary configuration of an imaging apparatus according to the sixth embodiment. As shown in FIG. 20, the imaging apparatus according to the present embodiment includes an optical system including a lens 61, an imaging device 62, a camera signal processing circuit 63, and a system controller 64.

The lens 61 images image light from a subject on an imaging plane of the imaging device 62. The imaging device 62 converts the image light imaged on the imaging plane by the lens 61 into an electric signal on a pixel-by-pixel basis, and outputs the image signal obtained as a result of the conversion. The solid-state imaging devices according to any one of the above-described embodiments can be used as the imaging device 62.

The camera signal processing circuit 63 performs various types of signal processing on the image signal output from the imaging device 62.

The system controller 64 controls the imaging device 62 and the camera signal processing circuit 63. For example, the imaging device 62 has a normal frame rate mode and a high frame rate mode. Additionally, the imaging device 62 controls the AD conversion operation in accordance with these modes. Here, the normal frame rate mode is an operation mode in a progressive scanning method in which information on all pixels is read out. The high frame rate mode is an operation mode in which the frame rate is increased by M times by setting the pixel exposure time to 1/M the exposure time in the normal frame rate mode. In such a case, the system controller 64 performs control for switching between the operation modes in accordance with an instruction provided from the outside.

As such, the imaging apparatus according to the sixth embodiment uses the solid-state imaging device according to any one of the above-described embodiments as the imaging device 62, thereby allowing a noise that cannot be removed by CDS processing to be removed using comparators. Accordingly, the imaging apparatus can improve the S/N characteristics of the image sensor, and therefore is advantageous in that it can significantly improve the image quality.

While the solid-state imaging device and the imaging apparatus according to the embodiments of the present disclosure have been described above, the present disclosure is not limited to these embodiments.

The processing units included in the solid-state imaging devices according to the above-described embodiments can be implemented as LSIs, which are typically integrated circuits. These may be individually formed as chips, or may be partially or wholly integrated into a single chip.

The circuit integration is not limited to LSIs, and the integrated circuit may be implemented by a dedicated circuit or a general-purpose processor. FPGA (Field Programmable Gate Array) that can be programmed after LSI production, or a reconfigurable processor that allows reconfiguration of the connection or settings of circuit cells in LSIs may be used.

The solid-state imaging device according to the embodiments of the present disclosure or a part of the function thereof may be implemented by a processor such as a CPU executing a program.

Furthermore, the present disclosure may be the above-mentioned program, or may be a non-transient computer-readable recording medium having the program recorded thereon. Needless to say, the program can be distributed via a transmission medium such as the Internet.

At least some of the functions of the solid-state imaging devices and the imaging apparatus according to the first to sixth embodiments, and the modifications thereof may be combined.

All the numerical values used above are examples to specifically describe the present disclosure, and the present disclosure is not limited to the exemplary numerical values. Furthermore, the logic levels represented by "high" and "low" or the switching states represented by "on" and "off" are examples to specifically describe the present disclosure, and an equivalent result can also be achieved using a different combination of the exemplary logic levels or switching states. The n-type and p-type of transistors and the like are examples to specifically describe the present disclosure, and an equivalent result can also be achieved by inverting these types. The connection relationship between components is an example to specifically describe the present disclosure, and the connection relationship that implements the functions of the present disclosure is not limited to such an example.

The division of the functional blocks in the block diagrams are merely examples. It is possible to implement a plurality of functional blocks as a single functional block, divide a single functional block into a plurality of functional blocks, or move a part of the function to another functional block. The functions of a plurality of functional blocks having similar functions may be processed by a single piece of hardware or software in a parallel manner or a time-division manner.

Although examples in which MOS transistors are used are shown in the above description, it is possible to use other transistors.

The circuit configurations shown in the circuit diagrams described above are merely examples, the present disclosure is not limited to these circuit configurations. That is, circuits that can implement the characteristic functions of the present disclosure as with the circuit configurations described above are also included in the present disclosure. For example, a circuit in which an element such as a switching element (transistor), a resistance element, or a capacitive element is connected to a given element in serial or in parallel is also included in the present disclosure, so long as the same functions as those of the circuit configurations described above can be achieved. In other words, the term "connected" in the embodiments described above is not limited to direct connection between two terminals (nodes), but also encompass connection of the two terminals (nodes) via an element, so long as the same functions can be achieved.

Although only some exemplary embodiments of the present invention have been described in detail above, various modifications made by making changes conceivable to those skilled in the art to the present embodiments are also intended to be included within the scope on the present disclosure, without departing from the spirit or essential characteristics of the disclosure.

INDUSTRIAL APPLICABILITY

The present disclosure is applicable to a solid-state imaging device. The present disclosure is also applicable to a digital video camera, a digital still camera, a mobile phone device or the like that uses a solid-state imaging device.

The invention claimed is:

1. A solid-state imaging device comprising:
a plurality of pixel cells arranged in rows and columns, each of the pixel cells including a photoelectric conversion element that generates a signal charge according to an amount of light received and an amplifying transistor that generates a signal voltage by amplifying the signal charge;
a plurality of vertical signal lines each of which is provided for a corresponding one of the columns and to each of which are output the signal voltages generated by pixel cells included in the plurality of pixel cells that are disposed in a corresponding one of the columns; and
a plurality of column circuits each of which is provided for a corresponding one or more of the columns and into each of which are input the signal voltages output to one or more of the vertical signal lines disposed in the corresponding one or more of the columns,
wherein each of the plurality of column circuits includes an amplifier into which input signals based on the signal voltages are input and that includes a constant current source transistor,
the solid-state imaging device further comprises
a reference current source circuit that supplies a first bias voltage to gates of a plurality of the constant current source transistors included in the plurality of column circuits, and
each of the plurality of column circuits further includes
a sample-and-hold circuit that holds the first bias voltage.

2. The solid-state imaging device according to claim 1,
wherein each of the plurality of column circuits includes an AD conversion unit configured to convert the signal voltages into digital signals,
the AD conversion unit includes a comparator that compares the signal voltages with a reference signal,
the amplifier is an amplifier that is included in the comparator and into which the signal voltages and the reference signal are input, and
the sample-and-hold circuit holds the first bias voltage during a period in which the comparator compares the reference signal and one of the signal voltages.

3. The solid-state imaging device according to claim 2,
wherein the amplifier includes:
a differential amplifier that compares the signal voltages with the reference signal; and
an amplifying amplifier that includes the constant current source transistor and amplifies an output signal of the differential amplifier, and
the sample-and-hold circuit holds the first bias voltage during a period in which the differential amplifier compares the reference signal and the one of the signal voltages.

4. The solid-state imaging device according to claim 2,
wherein the sample-and-hold circuit samples the first bias voltage outside the period in which the comparator compares the reference signal and the one of the signal voltages.

5. The solid-state imaging device according to claim 1,
wherein each of the plurality of column circuits includes a signal amplifier that includes the amplifier and amplifies one of the signal voltages, and
the sample-and-hold circuit holds the first bias voltage during a period in which the signal amplifier amplifies the one of the signal voltages.

6. The solid-state imaging device according to claim 5,
wherein the sample-and-hold circuit samples the first bias voltage outside the period in which the signal amplifier amplifies the one of the signal voltages.

7. The solid-state imaging device according to claim 1,
wherein the sample-and-hold circuit includes:
a sample-and-hold transistor connected between the gate of the constant current source transistor and the reference current source circuit; and
a sample-and-hold capacitor connected to the gate of the constant current source transistor.

8. The solid-state imaging device according to claim 1,
further comprising
a bias line connected to the reference current source circuit; and a plurality of the sample-and-hold circuits included in the plurality of column circuits,
wherein the reference current source circuit supplies the first bias voltage to the gates of the plurality of constant current source transistors via the bias line.

9. The solid-state imaging device according to claim 8,
wherein the reference current source circuit includes:
a transistor that forms a current mirror circuit together with each of the constant current source transistors; and
a reference current source that supplies a reference current to the transistor.

10. The solid-state imaging device according to claim 1,
wherein the reference current source circuit includes a plurality of first reference current source units each of which is provided for a corresponding one of the column circuits, and
each of the plurality of first reference current source units includes:
a current mirror transistor that forms a current mirror circuit together with the constant current source transistor and supplies the first bias voltage to the gate of the constant current source transistor; and
a reference current source transistor that supplies a reference current to the current mirror transistor.

11. The solid-state imaging device according to claim 10,
wherein the reference current source circuit further includes:
a bias line connected to gates of a plurality of the reference current source transistors included in the plurality of first reference current source units; and
a second reference current source unit configured to supply a second bias voltage to the gates of the plurality of reference current source transistors via the bias line.

12. The solid-state imaging device according to claim 1,
wherein the amplifier is a grounded-source amplifier.

13. The solid-state imaging device according to claim 1, wherein the column circuits each further include a power-down control unit configured to stop the amplifier.

14. An imaging apparatus comprising the solid-state imaging device according to claim 1.

\* \* \* \* \*